United States Patent
Yokoyama

(10) Patent No.: US 8,538,412 B2
(45) Date of Patent: Sep. 17, 2013

(54) MOBILE STATION, BASE STATION, AND COMMUNICATION SYSTEM CAPABLE OF COMMUNICATION THROUGH A PLURALITY OF RADIO INTERFACES

(75) Inventor: Hitoshi Yokoyama, Shinagawa (JP)

(73) Assignee: Fujitsu Limited, Kawasaki (JP)

( * ) Notice: Subject to any disclaimer, the term of this patent is extended or adjusted under 35 U.S.C. 154(b) by 6 days.

(21) Appl. No.: 13/564,068

(22) Filed: Aug. 1, 2012

(65) Prior Publication Data
US 2012/0295612 A1 Nov. 22, 2012

Related U.S. Application Data

(63) Continuation of application No. PCT/JP2010/054594, filed on Mar. 17, 2010.

(51) Int. Cl.
*H04W 4/00* (2009.01)
(52) U.S. Cl.
USPC .......................... 455/422.1; 370/331
(58) Field of Classification Search
USPC .................. 455/422.1, 432.2–444
See application file for complete search history.

(56) References Cited

U.S. PATENT DOCUMENTS

| 6,958,984 | B2 * | 10/2005 | Kotzin | 370/335 |
| 2003/0169716 | A1 | 9/2003 | Saito | |
| 2005/0272428 | A1 | 12/2005 | Tanabe et al. | |
| 2009/0135944 | A1 * | 5/2009 | Dyer et al. | 375/267 |
| 2010/0020767 | A1 | 1/2010 | Kumai et al. | |
| 2011/0134882 | A1 * | 6/2011 | Aoyama et al. | 370/331 |

FOREIGN PATENT DOCUMENTS

| JP | 6-45991 | 2/1994 |
| JP | 2003-235069 | 8/2003 |
| JP | 2006-20270 | 1/2006 |
| JP | 2007-221195 | 8/2007 |
| JP | 2008-245031 | 10/2008 |
| JP | 2009-177762 | 8/2009 |
| JP | 2009-267876 | 11/2009 |
| WO | 2008/072687 | 6/2008 |

OTHER PUBLICATIONS

International Search Report dated Apr. 27, 2010, from corresponding International Application No. PCT/JP2010/054594.

* cited by examiner

*Primary Examiner* — Charles Appiah
*Assistant Examiner* — Emem Stephen
(74) *Attorney, Agent, or Firm* — Katten Muchin Rosenman LLP

(57) ABSTRACT

A mobile station capable of communication through a plurality of radio interfaces differing in at least one among radio scheme and frequency band, includes a determining unit that determines execution of concurrent communication based on a communication state of the mobile station, the concurrent communication concurrently using the radio interfaces for communication; and a communicating unit that performs the concurrent communication based on a determination result obtained by the determining unit.

12 Claims, 16 Drawing Sheets

FIG.3

| TRANSFER DELAY [ms] | CONCURRENT COMMUNICATION COUNT |
|---|---|
| 0-100 | 1 |
| 101-200 | 2 |
| 201-250 | 3 |
| 251-300 | 4 |
| 301-350 | 5 |
| ⋮ | ⋮ |

FIG.4

| PRIORITY | RADIO INTERFACE |
|---|---|
| HIGH ↕ LOW | LTE Band 1 |
| | LTE Band 2 |
| | WiMAX |
| | W-CDMA Band 1 |
| | W-CDMA Band 2 |
| | ⋮ |

FIG.5

| BEARER | CONCURRENT COMMUNICATION COUNT | RADIO INTERFACE |
|---|---|---|
| CONTROL SIGNAL | 1 | LTE Band 1 |
| VoIP | 2 | LTE Band 1<br>LTE Band 2 |
| BE | 3 | LTE Band 1<br>WiMAX<br>W-CDMA Band 1 |

| BEARER: VoIP | |
|---|---|
| AVERAGE VALUE OF LOAD INFORMATION [%] | JUDGING-AIDED INFORMATION |
| 0 - 50 | VoIP-A |
| 51 - 75 | VoIP-B |
| 76 - 100 | VoIP-C |

FIG.20

VoIP-A

| TRANSFER DELAY [ms] | CONCURRENT COMMUNICATION COUNT |
|---|---|
| 0 - 50 | 1 |
| 51 - 90 | 2 |
| 91 - 150 | 3 |
| 151 - | 4 |

FIG.21

VoIP-B

| TRANSFER DELAY [ms] | CONCURRENT COMMUNICATION COUNT |
|---|---|
| 0 - 70 | 1 |
| 71 - 100 | 2 |
| 101 - 150 | 3 |
| 151 - | 4 |

| BEARER: BE | |
|---|---|
| AVERAGE VALUE OF LOAD INFORMATION [%] | JUDGING-AIDED INFORMATION |
| 0 - 60 | BE-A |
| 61 - 100 | BE-B |

| TRANSFER DELAY [ms] | THROUGHPUT OF MOBILE STATION [Mbps] | CONCURRENT COMMUNICATION COUNT |
|---|---|---|
| 0 - 300 | 11 - | 1 |
| 0 - 300 | - 10 | 2 |
| 301 - | 11 | 2 |
| 301 - | - 10 | 3 |

BE-B

| BATTERY REMAINING AMOUNT OF MOBILE STATION [%] | CONCURRENT COMMUNICATION |
|---|---|
| 31 - 100 | OK |
| 0 - 30 | NG |

2400

MOBILE STATION, BASE STATION, AND COMMUNICATION SYSTEM CAPABLE OF COMMUNICATION THROUGH A PLURALITY OF RADIO INTERFACES

CROSS REFERENCE TO RELATED APPLICATIONS

This application is a continuation application of International Application PCT/JP2010/054594, filed on Mar. 17, 2010 and designating the U.S., the entire contents of which are incorporated herein by reference.

FIELD

The embodiments discussed herein are related to a mobile station, a base station, a communication system, and a communication method that perform radio communication.

BACKGROUND

Among radio communication technologies, a new system has been defined in order to use a wider frequency band and an increased number of information bits per band and thus, achieve improved throughput. In some technologies, when a new system is introduced, throughput is improved through cooperation (concurrent communication) with an existing system (see, e.g., Japanese Laid-Open Patent Publication No. H6-045991). Technologies of cooperation between a new system and an existing system include cooperation among multiple systems and cooperation among multiple bands.

For example, a base station collects communication states of mobile stations, determines whether to perform cooperation between a new system and an existing system based on the collected communication states, and notifies the mobile stations and nearby base stations of a decision to control the concurrent communication.

However, in the conventional technique described above, in order for the base station to determine whether to perform concurrent communication, the communication state of a mobile station is reported to the base station by the mobile station, putting pressure on control channel radio resources and reducing data communication throughput. If the mobile station less frequently notifies the base station of the communication state, triggering of the concurrent communication is delayed, making effective concurrent communication impossible.

For example, when delay tolerance of a Voice over IP (VoIP) bearer is 100 [ms] and a period of notification of a communication state from a mobile station to a base station is several hundred [ms], a loss of several packets occurs due to a delay of the triggering of the concurrent communication, leading to characteristic deterioration.

SUMMARY

According to an aspect of an embodiment, a mobile station capable of communication through multiple radio interfaces differing in at least one among radio scheme and frequency band, includes a determining unit that determines execution of concurrent communication based on a communication state of the mobile station, the concurrent communication concurrently using the radio interfaces for communication; and a communicating unit that performs the concurrent communication based on a determination result obtained by the determining unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram of an example of judging-aided information of a concurrent communication count;

FIG. 4 is a diagram of one example of priority information of radio interfaces;

FIG. 5 is a diagram of an example of concurrent communication notification;

FIG. 19 is a diagram of a first example of a correlation table between the average value of load information and the judging-aided information;

FIG. 20 is a diagram of a first example of the judging-aided information of the concurrent communication count;

FIG. 21 is a diagram of a second example of the judging-aided information of the concurrent communication count;

FIG. 22 is a diagram of a second example of the correlation table between the average value of the load information and the judging-aided information;

DESCRIPTION OF EMBODIMENTS

Preferred embodiments of the disclosed technology will be explained with reference to the accompanying drawings. In the disclosed technology, a mobile station determines whether to perform concurrent communication based on the communication state of the mobile station, thereby enabling the determination to be made without notification of the communication state from the mobile station to a base station and thus, improving throughput.

Figure 1:
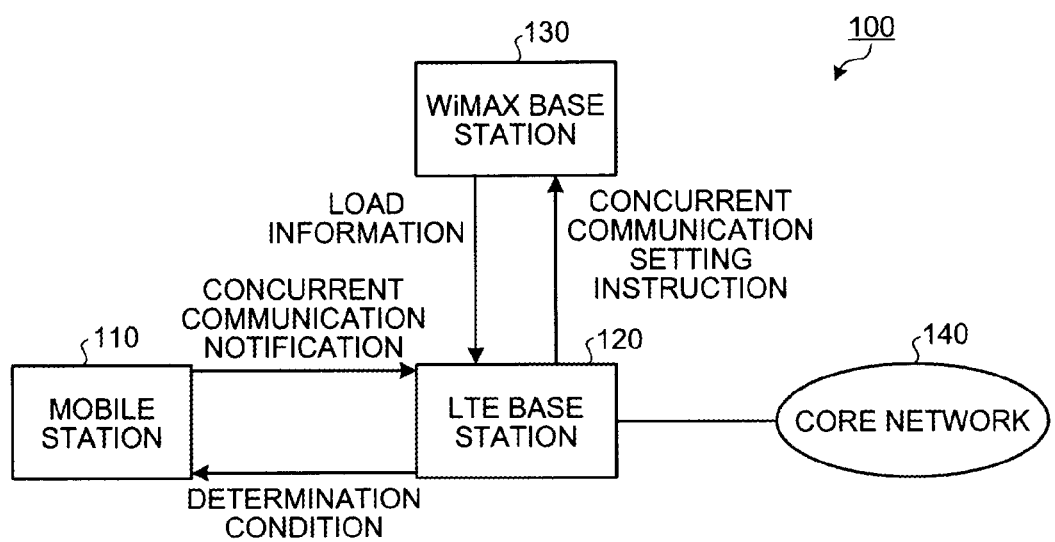
FIG. 1 is a block diagram of a communication system according to an embodiment.

FIG. 1 is a block diagram of a communication system according to an embodiment. As depicted in FIG. 1, a communication system 100 according to the embodiment includes a mobile station 110, an LTE base station 120, a WiMAX base station 130, and a core network 140. The LTE base station 120, the WiMAX base station 130, and the core network 140 are connected over a wired network, for example. In this case, the mobile station 110 is assumed to be communicating with the LTE base station 120.

The mobile station 110 is a mobile station capable of communication through radio interfaces having differing radio schemes and/or frequency bands. The radio interfaces include the frequency bands of the LTE scheme radio communication performed with the LTE base station 120 and the frequency bands of the WiMAX scheme radio communication performed with the WiMAX base station 130. As described above, radio interfaces available to the mobile station 110 may include radio interfaces corresponding to different base stations.

The mobile station 110 performs concurrent communication (parallel transfer) in which multiple radio interfaces are used concurrently for communication. For example, the mobile station 110 performs data communication with the core network 140 under concurrent communication. As a result, the throughput can be improved in the data communication with the core network 140. The mobile station 110 may perform the concurrent communication for each bearer (communication service) used.

The mobile station 110 makes a determination concerning the execution of the concurrent communication, based on a communication state of the mobile station 110. For example, the determination concerning the concurrent communication is a determination of whether the concurrent communication is to be performed. The determination concerning execution of the concurrent communication may include a determination concerning the number of radio interfaces to be used in the concurrent communication (concurrent communication count) and a determination concerning the radio interfaces to be used in the concurrent communication. The communication state of the mobile station 110 is a communication quality such as parameters included in Quality of Service (QoS), for example. The parameters included in QoS include a maximum delay value indicative of a packet transfer wait.

The mobile station 110 transmits to the LTE base station 120, a concurrent communication notification indicative of a determination result concerning the concurrent communication. The mobile station 110 may receive from the communication system 100, a determination condition of the concurrent communication, i.e., a determination condition having parameters including the communication state of the mobile station 110. In this case, the mobile station 110 makes a determination concerning the concurrent communication based on the received determination condition and the communication state of the mobile station 110.

The mobile station 110 may acquire communication qualities of multiple radio interfaces in the mobile station 110. The communication qualities are, for example, a signal to interference and noise ratio (SINR) and buffer status report (BSR) indicative of a data buffer remaining amount of the mobile station 110. The mobile station 110 determines the radio interfaces used in the concurrent communication, exclusive of a radio interface having an acquired communication quality less than a threshold value.

The LTE base station 120 performs radio communication with the mobile station 110. The LTE base station 120 controls the concurrent communication determined by the mobile station 110. The control of the concurrent communication is performed by a radio controller of the LTE base station 120.

For example, the LTE base station 120 transmits a concurrent communication setting instruction instructing the setting of the concurrent communication of the mobile station 110 to a base station corresponding to a radio interface used in the concurrent communication determined by the mobile station 110. For example, if the WiMAX base station 130 is included in the radio interfaces used in the concurrent communication, the LTE base station 120 transmits the concurrent communication setting instruction to the WiMAX base station 130.

The LTE base station 120 may transmit to the mobile station 110, a determination condition of the concurrent communication at the mobile station 110, i.e., a determination condition having parameters including the communication state of the mobile station 110. For example, the LTE base station 120 acquires load information indicating the load amounts (traffic amounts) corresponding to the radio interfaces available to the mobile station 110. The load information is, for example, a radio usage rate indicative of the ratio of radio bands actually used in communication, among the available radio bands. The load information may be a radio band usage rate or cell throughput at the guarantee bit rate (GBR).

For example, the LTE base station 120 receives from the WiMAX base station 130, the load information of the radio interfaces compatible with the WiMAX base station 130. The LTE base station 120 acquires from the management information of the LTE base station 120, the load information of the radio interfaces compatible with the LTE base station 120. The LTE base station 120 generates a determination condition of the concurrent communication based on the acquired load information. The LTE base station 120 transmits the generated determination condition to the mobile station 110.

The determination condition of the concurrent communication includes, for example, judging-aided information correlating a communication state of the mobile station 110 with the concurrent communication count (the number of radio interfaces). For example, the judging-aided information is set such that the better the communication state of the mobile station 110 is, the smaller the concurrent communication count becomes. As a result, if the communication state of the mobile station 110 deteriorates, the concurrent communication count can be increased to maintain the throughput.

The determination condition of the concurrent communication may include, for example, priority information indicative of the priorities of the radio interfaces available to the mobile station 110. For example, the priority information is set such that a higher priority is given to a radio interface having a smaller load amount on the base station side. As a result, a radio interface having a smaller load amount is preferentially determined as a radio interface used in the concurrent communication and the traffic can be distributed to improve the throughput.

The WiMAX base station 130 is a nearby base station in a vicinity of the LTE base station 120. The WiMAX base station 130 transmits to the LTE base station 120 the load information of the radio interfaces compatible with the WiMAX base station 130. For example, the transmission of the load information to the LTE base station 120 may periodically be performed or may be performed in response to an inquiry from the LTE base station 120.

Upon receiving a concurrent communication setting instruction from the LTE base station 120, the WiMAX base station 130 participates in the concurrent communication at the mobile station 110. For example, the WiMAX base station 130 performs radio communication with the mobile station 110 to relay communication between the mobile station 110 and the LTE base station 120. As a result, the mobile station 110 can perform the concurrent communication using the radio interface of the mobile station 110 and the radio interface of the WiMAX base station 130 simultaneously. The WiMAX base station 130 may perform communication with the core network 140 to relay communication between the mobile station 110 and the core network 140.

Although description has been given where the concurrent communication uses a radio interface compatible with the LTE base station 120 and a radio interface compatible with the WiMAX base station 130 simultaneously, the form of the concurrent communication is not limited hereto. For example, the mobile station 110 may perform concurrent communication simultaneously using the radio interfaces of multiple bands compatible with the LTE base station 120.

Although the LTE base station 120 and the WiMAX base station 130 have been described as the base stations with which the mobile station 110 can perform radio communication, the scheme of the base station is not limited hereto and, for example, a base station of the W-CDMA scheme (see, e.g., FIG. 2) may be used.

Figure 2:
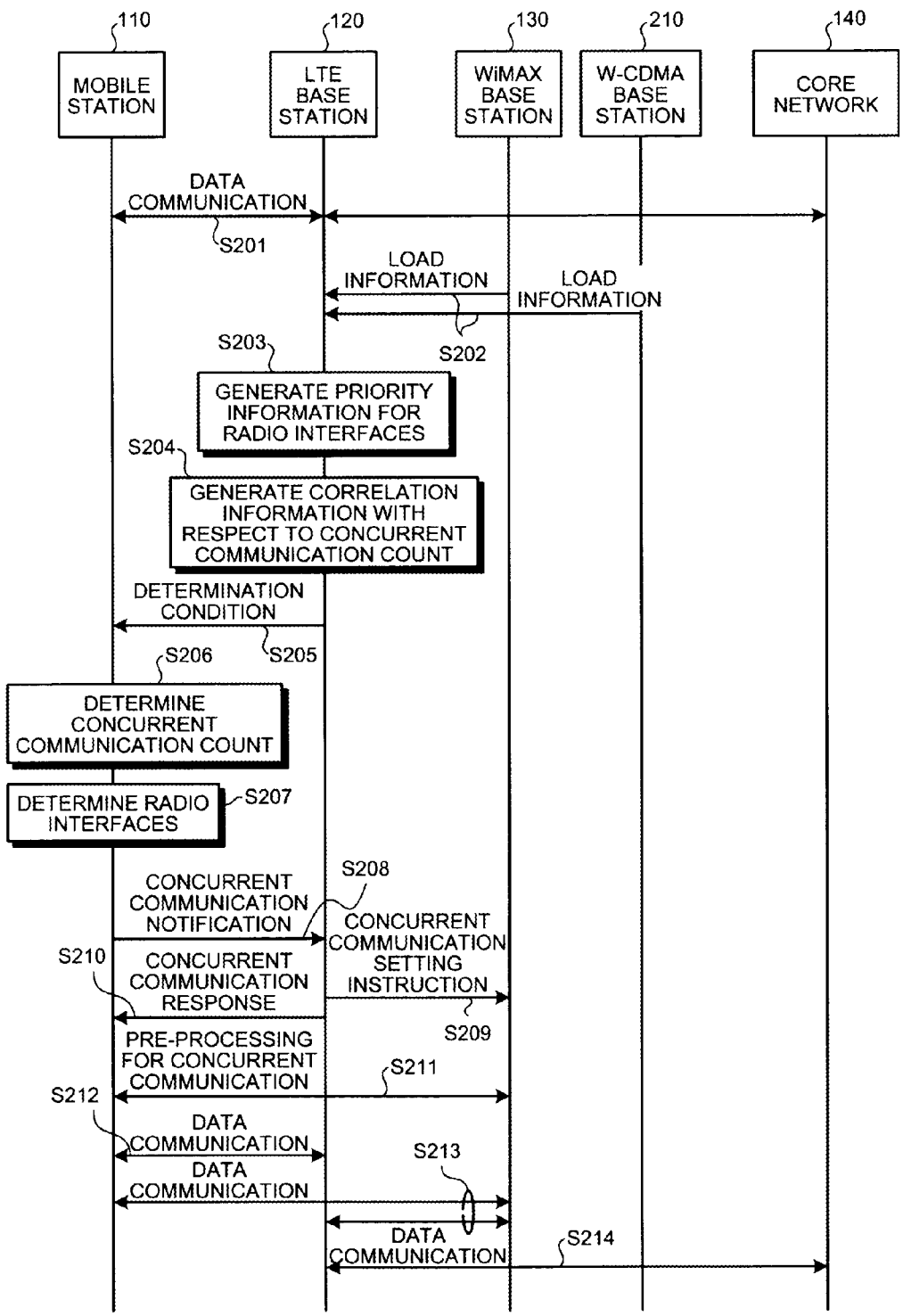
FIG. 2 is a sequence diagram of an example of operations of the communication system.

FIG. 2 is a sequence diagram of an example of operations of the communication system. In this example, the mobile station 110 is assumed to perform data communication with the core network 140 through the relay of the LTE base station 120 (step S201). The WiMAX base station 130 and a W-CDMA base station 210 are assumed to be registered at the LTE base station 120 as nearby base stations. The LTE base station 120 receives the load information transmitted from the WiMAX base station 130 and the W-CDMA base station 210 (step S202).

The LTE base station 120 determines priorities of the radio interfaces based on the load information received at step S202 and generates priority information indicating the determined priorities (step S203). The LTE base station 120 generates judging-aided information correlating the communication state of the mobile station 110 with the concurrent communication count (the number of the radio interfaces), based on the load information received at step S202 (step S204).

The LTE base station 120 transmits to the mobile station 110, the determination condition of the concurrent communication including the priority information generated at step S203 and the judging-aided information generated at step S204 (step S205). The mobile station 110 determines the concurrent communication count, based on the communication state of the mobile station 110 and the judging-aided information included in the determination condition transmitted at step S205 (step S206). In this example, the concurrent communication count is assumed to be determined as three.

The mobile station 110 determines the radio interfaces used in the concurrent communication based on the priority information included in the determination condition transmitted at step S205 and the concurrent communication count determined at step S206 (step S207). In this example, the radio interfaces are assumed to be determined as radio interfaces of two bands in the LTE base station 120 and a radio interface of one band in the WiMAX base station 130.

The mobile station 110 transmits to the LTE base station 120, a concurrent communication notification indicating that the concurrent communication is performed through the radio interface determined at step S207 (step S208). The LTE base station 120 transmits a concurrent communication setting instruction to the base stations corresponding to the radio interfaces of the notification at step S208 (step S209). Since the base stations corresponding to the radio interfaces of the notification are the LTE base station 120 and the WiMAX base station 130, the LTE base station 120 transmits the concurrent communication setting instruction to the WiMAX base station 130, exclusive of the LTE base station 120. The LTE base station 120 transmits a concurrent communication response to the mobile station 110 (step S210).

The mobile station 110 executes pre-processing of the concurrent communication performed with the WiMAX base station 130. For example, notification of communication quality such as SINR and BSR is performed between the mobile station 110 and the WiMAX base station 130. The mobile station 110 starts data communication through the concurrent communication with the LTE base station 120 and the WiMAX base station 130. For example, the mobile station 110 directly performs the data communication with the LTE base station 120 (step S212) while performing the data communication via the WiMAX base station 130 with the LTE base station 120 (step S213).

The LTE base station 120 operates as an anchor to relay the data communication between the mobile station 110 and the core network 140 (step S214). For example, the LTE base station 120 combines and transmits to the core network 140 in an uplink (UL) from the mobile station 110 to the core network 140, the data directly received from the mobile station 110 and the data from the mobile station 110 received via the WiMAX base station 130.

The LTE base station 120 separates the data received from the core network 140 in a downlink (DL) from the core network 140 to the mobile station 110. The LTE base station 120 directly transmits one of the separated data to the mobile station 110 and transmits the other separated data via the WiMAX base station 130 to the mobile station 110. As a result, the mobile station 110 can perform data communication with the core network 140 through the concurrent communication with the LTE base station 120 and the WiMAX base station 130.

The collection of the load information at step S202 may be performed periodically. In this case, the LTE base station 120 periodically performs the generation of the determination condition of the concurrent communication at steps S203 and S204 and the transmission of the determination condition of the concurrent communication to the mobile station 110 at step S205. The mobile station 110 periodically performs the concurrent communication determinations at steps S206 and S207 and the transmission of the concurrent communication notification at step S208.

Although description has been given for a case where the LTE base station 120 collects the load information of the WiMAX base station 130 and the W-CDMA base station 210 at step S202, the method of acquiring the load information is not limited hereto. For example, the LTE base station 120 may share the load information between the WiMAX base station 130 and the W-CDMA base station 210 by using a neighboring cell list (NCL) prescribed by LTE.

FIG. 3 is a diagram of an example of the judging-aided information of the concurrent communication count. A table 300 depicted in FIG. 3 is an example of the judging-aided information between the communication state and the concurrent communication count generated at step S204 of FIG. 2. This example will be described as a case where the maximum transfer delay amount of the packet transfer wait is used as the communication state of the mobile station 110. In the table 300, the concurrent communication count is correlated with each range of the maximum transfer delay amount of the packet transfer wait (transfer delay).

For example, the table 300 indicates that if the maximum transfer delay amount in the mobile station 110 is 0 to 100 [ms], the mobile station 110 should set the concurrent communication count to one. In this case, the mobile station 110 performs communication using one radio interface without performing the concurrent communication. The table 300 indicates that if the maximum transfer delay amount in the mobile station 110 is 101 to 200 [ms], the mobile station 110 should set the concurrent communication count to two. In this case, the mobile station 110 performs the concurrent communication using two radio interfaces.

FIG. 4 is a diagram of one example of the priority information of radio interfaces. A table 400 depicted in FIG. 4 is an example of the priority information of radio interfaces generated at step S203 of FIG. 2. In the table 400, "LTE Band 1" and "LTE Band 2" indicate respective bands of communication with the LTE base station 120.

"WiMAX" indicates communication with the WiMAX base station 130. "W-CDMA Band 1" and "W-CDMA Band 2" indicate respective bands of communication with the W-CDMA base station 210. The table 400 indicates that a higher priority is given in the order of "LTE Band 1", "LTE Band 2", "WiMAX", "W-CDMA Band 1", "W-CDMA Band 2", etc.

The tables 300 and 400 depicted in FIGS. 3 and 4 are transmitted to the mobile station 110 as the determination condition of the concurrent communication at step S205 of FIG. 2. The mobile station 110 determines the concurrent communication count based on the table 300 at step S206 of FIG. 2. For example, if the maximum transfer delay value in the mobile station 110 is 40 [ms], the mobile station 110 determines the concurrent communication count as one. If the maximum transfer delay value in the mobile station 110 is 220 [ms], the mobile station 110 determines the concurrent communication count as three.

The mobile station 110 determines the radio interfaces used in the concurrent communication based on the determined concurrent communication count and the table 400 at step S207 of FIG. 2. For example, if the determined concurrent communication count is one, "LTE Band 1" having the highest priority in the table 400 is determined as the radio interface used in the communication.

The mobile station 110 may determine from among the radio interfaces in the table 400, radio interfaces having communication quality greater than or equal to a threshold value as the radio interfaces used in the concurrent communication. For example, the communication quality of the "LTE Band 1" is assumed to be less than the threshold value and the communication quality of the "LTE Band 2" is assumed to be greater than or equal to the threshold value. In this case, the mobile station 110 determines "LTE Band 1" having the highest priority among the radio interfaces having a communication quality greater than or equal to the threshold value, as the radio interface used in the communication.

If the determined concurrent communication count is three, the mobile station 110 determines "LTE Band 1", "LTE Band 2", and "WiMAX" within the third priority in the table 400 as the radio interfaces used in the concurrent communication. If the communication quality of "LTE Band 1" is assumed to be less than the threshold value and the communication qualities of the "LTE Band 2", "WiMAX", and "W-CDMA Band 1" are assumed to be greater than or equal to the threshold value, the mobile station 110 determines among the radio interfaces having a communication quality greater than or equal to the threshold value, "LTE Band 2", "WiMAX", and "W-CDMA Band 1" of priorities up to the third priority, as the radio interfaces used in the concurrent communication.

Each of the tables 300 and 400 may be determined for each bearer used by the mobile station 110. The bearers are radio links for implementing various communication services such as VoIP, best effort (BE), and gaming, for example. The mobile station 110 determines the concurrent communication count and the radio interfaces to be used for each bearer.

FIG. 5 is a diagram of an example of concurrent communication notification. A table 500 depicted in FIG. 5 is an example of the concurrent communication notification transmitted from the mobile station 110 to the LTE base station 120 at step S208 of FIG. 2. The table 500 is a mapping of the communication system with the concurrent communication count and radio interfaces correlated for each bearer used by the mobile station 110.

In this example, the table 500 includes a control signal controlling various communications, VoIP for performing voice communication, and BE for performing best-effort communication, as the bearers. The concurrent communication count in the table 500 is the concurrent communication count determined at step S206 of FIG. 2. The radio interfaces of the table 500 are the radio interfaces determined at step S207 of FIG. 2.

The table 500 is transmitted from the mobile station 110 to the LTE base station 120 as the concurrent communication notification at step S208. When receiving the table 500 as the concurrent communication notification, the LTE base station 120 transmits the concurrent communication setting instruction to base stations other than the LTE base station 120, among the base stations corresponding to the radio interfaces included in the table 500 at step S209.

For example, in the example of the table 500, the base stations corresponding to the radio interfaces are the LTE base station 120 (LTE Band 1, 2), the WiMAX base station 130 (WiMAX), and the W-CDMA base station 210 (W-CDMA Band 1). Therefore, the LTE base station 120 transmits the concurrent communication setting instruction to the WiMAX base station 130 and the W-CDMA base station 210.

In the pre-processing at step S211 of FIG. 2, the mobile station 110 starts notifying the base stations corresponding to the radio interfaces used in the concurrent communication of the communication quality. For example, in the example of the table 500, the base stations corresponding to the radio interfaces used in the concurrent communication are the LTE base station 120 (LTE Band 1, 2), the WiMAX base station 130 (WiMAX), and the W-CDMA base station 210 (W-CDMA Band 1). Therefore, the mobile station 100 starts notifying the LTE base station 120, the WiMAX base station 130, and the W-CDMA base station 210 of the communication quality.

The mobile station 110 may give notification of the communication quality for each radio interface used in the concurrent communication. For example, the mobile station 110 notifies the LTE base station 120 of the radio states related to LTE Band 1 and Band 2. The mobile station 110 notifies the WiMAX base station 130 of the radio states related to WiMAX. The mobile station 110 notifies the W-CDMA base station 210 of the radio states related to W-CDMA Band 1.

As described above, the mobile station 110 notifies the base stations corresponding to the radio interfaces used in the concurrent communication of the communication quality and gives no notification of the communication quality to a base station corresponding to a radio interface not used in the concurrent communication. Therefore, for example, the utilization efficiency of frequency resource can be improved as compared to a case where the mobile station 110 notifies the base stations corresponding to all the available radio interfaces of the communication quality.

Figure 6:
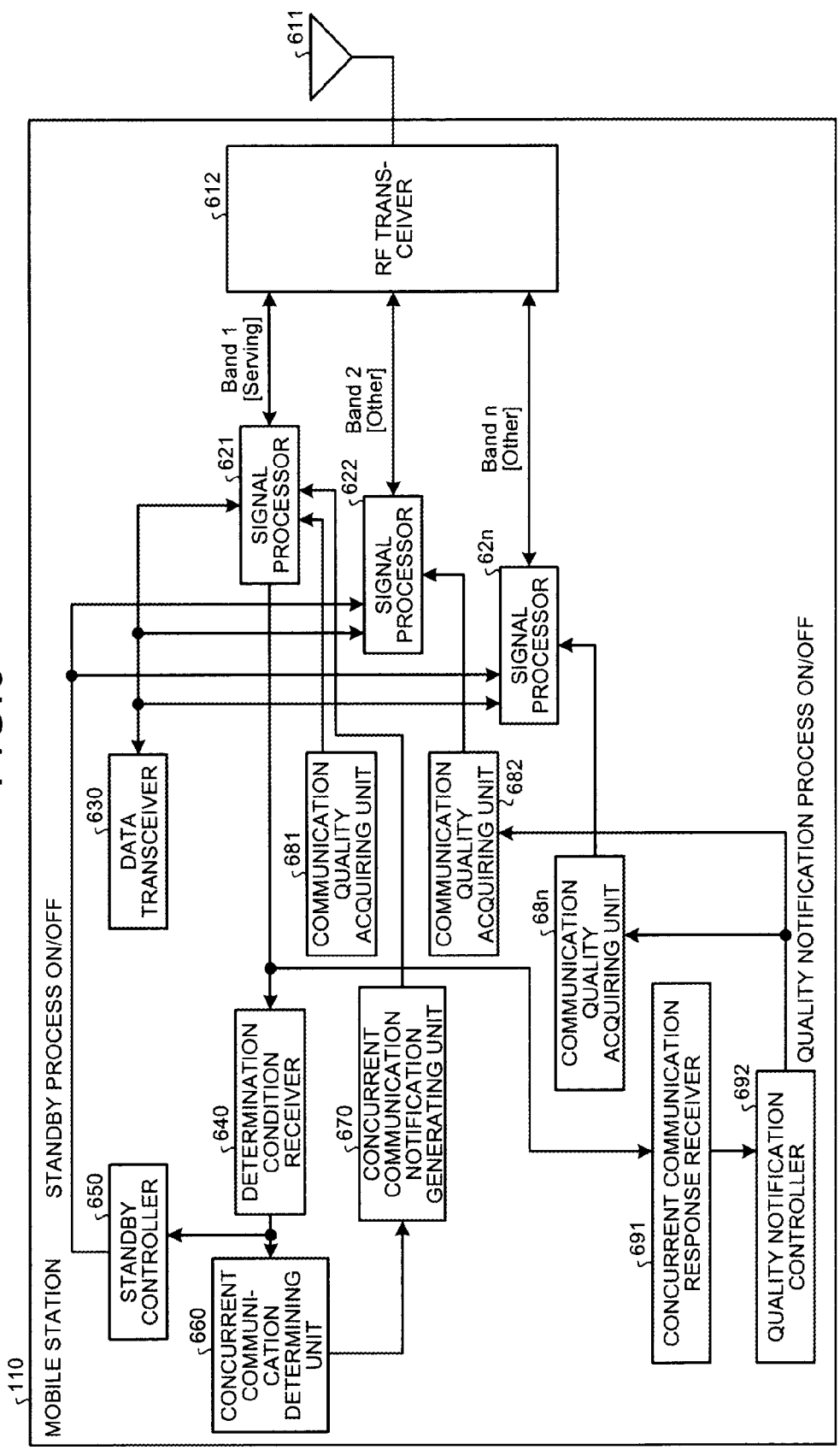
FIG. 6 is a block diagram of an example of a configuration of a base station.

FIG. 6 is a block diagram of an example of a configuration of the mobile station. As depicted in FIG. 6, the mobile station 110 includes an antenna 611, an RF transceiver 612, signal processors 621 to 62n, a data transceiver 630, a determination condition receiver 640, a standby controller 650, a concurrent communication determining unit 660, a concurrent communication notification generating unit 670, communication quality acquiring units 681 to 68n, a concurrent communication response receiver 691, and a quality notification controller 692. The RF transceiver 612 performs radio communication via the antenna 611 with a base station.

The signal processors 621 to 62n correspond to the different radio interfaces, respectively. Each of the signal processors 621 to 62n uses the antenna 611 and the RF transceiver 612 to execute signal transmission/reception processes through a corresponding radio interface.

The signal processor 621 corresponds to a radio interface Band 1 [Serving] corresponding to the band of the LTE scheme of the LTE base station 120 in communication with the mobile station 110. The signal processor 621 executes the signal transmission/reception processes via the antenna 611 and the RF transceiver 612 between the mobile station 110 and the LTE base station 120. The signal processor 621 outputs a control signal received from the LTE base station 120 to the determination condition receiver 640 and the concurrent communication response receiver 691. The signal processor 621 transmits to the LTE base station 120, the concurrent communication notification output from the concurrent communication notification generating unit 670. The signal processor 621 transmits to the LTE base station 120, the quality information output from the communication quality acquiring unit 681.

The signal processors 622 to 62n respectively correspond to radio interfaces Band 2 to Band n [Other]. The radio interfaces Band 2 to Band n are, for example, the radio interfaces of the WiMAX base station 130 and the W-CDMA base station 210. The signal processors 622 execute the signal transmission/reception processes via the antenna 611 and the RF transceiver 612 between the mobile station 110 and the WiMAX base station 130 or the W-CDMA base station 210. The signal processors 622 to 62n transmit to the base stations of the corresponding radio interfaces, the quality information output from the communication quality acquiring units 682 to 68n.

The data transceiver 630 transmits/receives data via the signal processors 621 to 62n to/from the base stations such as the LTE base station 120, the WiMAX base station 130, or the W-CDMA base station 210. The data transceiver 630 performs the concurrent communication using multiple radio interfaces simultaneously, among the signal processors 621 to 62n, for example.

The determination condition receiver 640 receives the determination condition included in the control signal output from the signal processor 621. The determination condition receiver 640 outputs the received determination condition to the standby controller 650 and the concurrent communication determining unit 660.

The standby controller 650 controls turning on/off a standby process in the signal processors 621 to 62n. For example, the standby controller 650 turns on the standby process in the signal processors 621 to 62n before the determination condition of the concurrent communication is output from the determination condition receiver 640.

When the determination condition of the concurrent communication is output from the determination condition receiver 640, the standby controller 650 sets the standby process in the signal processors 622 to 62n based on the determination condition of the concurrent communication. For example, the standby controller 650 turns on the standby process of radio interfaces that are candidates of the concurrent communication in the determination condition of the concurrent communication, among the signal processors 622 to 62n. Alternatively, the standby controller 650 turns off the standby process of radio interfaces that are not candidates of the concurrent communication in the determination condition of the concurrent communication, among the signal processors 622 to 62n.

As described above, the signal processors 621 to 62n and the standby controller 650 provide the standby control of executing the standby process for the candidates of the radio interfaces used in the concurrent communication and terminating the standby process for radio interfaces different from the candidates. As a result, the standby process can be omitted for the radio interfaces that are not candidates for the radio interfaces used in the concurrent communication, thereby reducing the processing amount at the mobile station 110.

The standby controller 650 provides the standby control based on candidate information included in the determination condition of the concurrent communication and indicative of candidates of the radio interfaces used in the concurrent communication. The candidate information is priority information included in the determining condition, for example. For example, the table 400 (priority information) depicted in FIG. 4 lists the candidates of the radio interfaces used in the concurrent communication.

The concurrent communication determining unit 660 determines the number of radio interfaces used in the concurrent communication (concurrent communication count), and the radio interfaces used in the concurrent communication, based on the determination condition of the concurrent communication output from the determination condition receiver 640. The concurrent communication determining unit 660 outputs the determined concurrent communication count and radio interfaces to the concurrent communication notification generating unit 670.

The concurrent communication notification generating unit 670 generates a concurrent communication notification including the concurrent communication count and the radio interfaces output from the concurrent communication determining unit 660. The concurrent communication notification generating unit 670 outputs the generated concurrent communication notification to the signal processor 621.

The communication quality acquiring units 681 to 68n respectively correspond to the radio interfaces of the signal processors 621 to 62n. Each of the communication quality acquiring units 681 to 68n acquires quality information indicative of communication quality (e.g., SINR and BSR) of the mobile station 110 in the corresponding radio interface. For example, each of the communication quality acquiring units 681 to 68n receives a reference signal of the corresponding radio interface from the base station and measures the communication quality to acquire the quality information. Each of the communication quality acquiring units 681 to 68n respectively outputs the acquired quality information to the signal processors 621 to 62n.

The communication quality acquiring units 682 to 68n output quality information if a respective quality notification process is turned on by the quality notification controller 692. The communication quality acquiring units 682 to 68n do not output quality information if the respective quality notification process is turned off by the quality notification controller 692. The communication quality acquiring unit 681 corresponds to the signal processor 621 used for communication with the mobile station 110 and therefore outputs the quality information.

The concurrent communication response receiver 691 receives a concurrent communication response included in the control signal output from the signal processor 621. The concurrent communication response receiver 691 outputs the received concurrent communication response to the quality notification controller 692.

The quality notification controller 692 controls turning on/off the quality notification process in the communication quality acquiring units 682 to 68n. For example, the quality notification controller 692 turns on the quality notification process of the radio interfaces used in the concurrent communication by the mobile station 110, among the signal processors 622 to 62n and based on the concurrent communication response output from the concurrent communication response receiver 691. The quality notification controller 692 turns off the quality notification process of the radio interfaces not used in the concurrent communication by the mobile station 110, among the signal processors 622 to 62n and based on the concurrent communication response output from the concurrent communication response receiver 691.

As described above, the communication quality acquiring units 681 to 68n and the quality notification controller 692 give notification of the quality information to the base stations corresponding to the radio interfaces determined as the radio interfaces used in the concurrent communication by the concurrent communication determining unit 660. The communication quality acquiring units 681 to 68n and the quality notification controller 692 give no notification of the quality information to the base stations corresponding to the radio interfaces not determined as the radio interfaces used in the concurrent communication by the concurrent communication determining unit 660. As a result, the notification process of the quality information of the radio interfaces not used in the concurrent communication can be omitted, thereby reducing a process amount in the mobile station 110.

Figure 7:
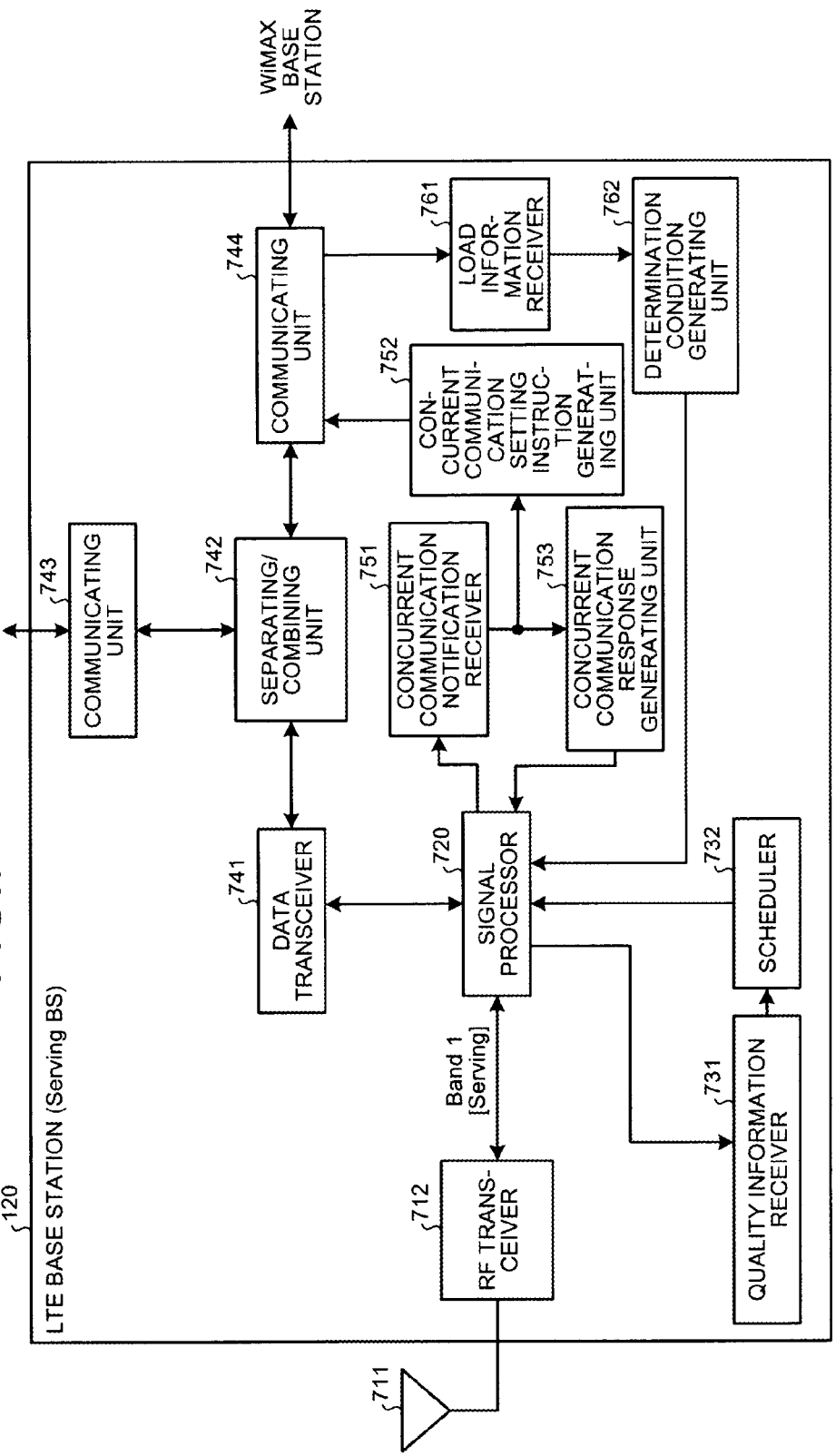
FIG. 7 is a block diagram of a base station controlling concurrent communication.

FIG. 7 is a block diagram of a base station controlling the concurrent communication. The LTE base station 120 is a base station (Serving BS) in communication with the mobile station 110 and controls the concurrent communication based on a concurrent communication notification from the mobile station 110. As depicted in FIG. 7, the LTE base station 120 includes an antenna 711, an RF transceiver 712, a signal processor 720, a quality information receiver 731, a scheduler 732, a data transceiver 741, a separating/combining unit 742, a communicating unit 743, a communicating unit 744, a concurrent communication notification receiver 751, a concurrent communication setting instruction generating unit 752, a concurrent communication response generating unit 753, a load information receiver 761, and a determination condition generating unit 762. The RF transceiver 712 performs radio communication via the antenna 711 with the mobile station 110.

The signal processor 720 corresponds to the Band 1 [Serving] of the LTE scheme. The signal processor 720 executes transmission/reception processes of signals to/from the mobile station 110 via the antenna 711 and the RF transceiver 712. The signal processor 720 outputs to the quality information receiver 731 and the concurrent communication notification receiver 751, a control signal received from the mobile station 110.

The signal processor 720 controls communication between the LTE base station 120 and the mobile station 110, based on a scheduling result output from the scheduler 732. The signal processor 720 transmits to the mobile station 110, the determination condition output from the determination condition generating unit 762. The signal processor 720 transmits to the mobile station 110, the concurrent communication response output from the concurrent communication response generating unit 753.

The quality information receiver 731 receives quality information included in the control signal output from the signal processor 720. The quality information receiver 731 outputs the received quality information to the scheduler 732. The scheduler 732 schedules the communication between the LTE base station 120 and the mobile station 110, based on the quality information output from the quality information receiver 731. The scheduler 732 outputs the scheduling result to the signal processor 720.

The data transceiver 741 relays data communication between the mobile station 110 and the core network 140. For example, the data transceiver 741 transmits/receives data via the signal processor 720 to/from the mobile station 110. The data transceiver 741 transmits/receives data via the separating/combining unit 742 to/from the core network 140.

The separating/combining unit 742 transmits/receives data via the communicating unit 743 to/from the core network 140. The separating/combining unit 742 transmits/receives data via the communicating unit 744 to/from a base station (e.g., the WiMAX base station 130) in a vicinity of the LTE base station 120. The separating/combining unit 742 executes a separating process and a combining process of data transferred through the concurrent communication of the mobile station 110.

For example, the separating/combining unit 742 acquires from the data transceiver 741, the data directly received from the mobile station 110 by the LTE base station 120 for UL from the mobile station 110 to the core network 140. The separating/combining unit 742 acquires from the communicating unit 744, the data received from the mobile station 110 via the WiMAX base station 130 by the LTE base station 120. The separating/combining unit 742 combines the acquired data and transmits the combined data via the communicating unit 743 to the core network 140.

The separating/combining unit 742 separates the data received via the communicating unit 743 from the core network 140 for DL from the core network 140 to the mobile station 110. The separating/combining unit 742 outputs one of the separated data to the data transceiver 741. The data output to the data transceiver 741 is directly transmitted from the LTE base station 120 to the mobile station 110. The separating/combining unit 742 transmits the other separated data via the communicating unit 744 to the WiMAX base station 130. The data transmitted to the WiMAX base station 130 is transmitted from the WiMAX base station 130 to the mobile station 110.

The communicating unit 743 is a communication interface for performing communication with the core network 140. The communicating unit 744 is a communication interface for performing communication with a base station (e.g., the WiMAX base station 130) in a vicinity of the LTE base station 120. The communicating unit 744 transmits to the load information receiver 761, a control signal received from a base station in a vicinity of the LTE base station 120. The communicating unit 744 transmits to a base station in a vicinity of the LTE base station 120, a concurrent communication setting instruction output from the concurrent communication setting instruction generating unit 752.

The concurrent communication notification receiver 751 receives a concurrent communication notification included in the control signal output from the signal processor 720. The concurrent communication notification receiver 751 outputs the received concurrent communication notification to the concurrent communication setting instruction generating unit 752 and the concurrent communication response generating unit 753.

The concurrent communication setting instruction generating unit 752 generates the concurrent communication setting instruction based on the concurrent communication notification output from the concurrent communication notification receiver 751. For example, the concurrent communication setting instruction generating unit 752 generates a concurrent communication setting instruction for base stations corresponding to the radio interfaces indicated by the concurrent communication notification. The concurrent communication setting instruction includes the identification information of the mobile station 110 that the primary actor in the concurrent communication and the information of the radio interfaces used in the concurrent communication. The concurrent communication setting instruction generating unit 752 outputs the generated concurrent communication setting instruction to the communicating unit 744.

The concurrent communication response generating unit 753 generates a concurrent communication response for the concurrent communication notification output from the concurrent communication notifying unit 751. The concurrent communication response generating unit 753 outputs the generated concurrent communication response to the signal processor 720.

The load information receiver 761 receives the load information included in the control signal output from the communicating unit 744. The load information receiver 761 outputs the received load information to the determination condition generating unit 762. The determination condition generating unit 762 generates the determination condition of the concurrent communication at the mobile station 110, based on the load information output from the load information receiver 761. The determination condition generating unit 762 outputs the generated determination condition of the concurrent communication to the signal processor 720.

Figure 8:
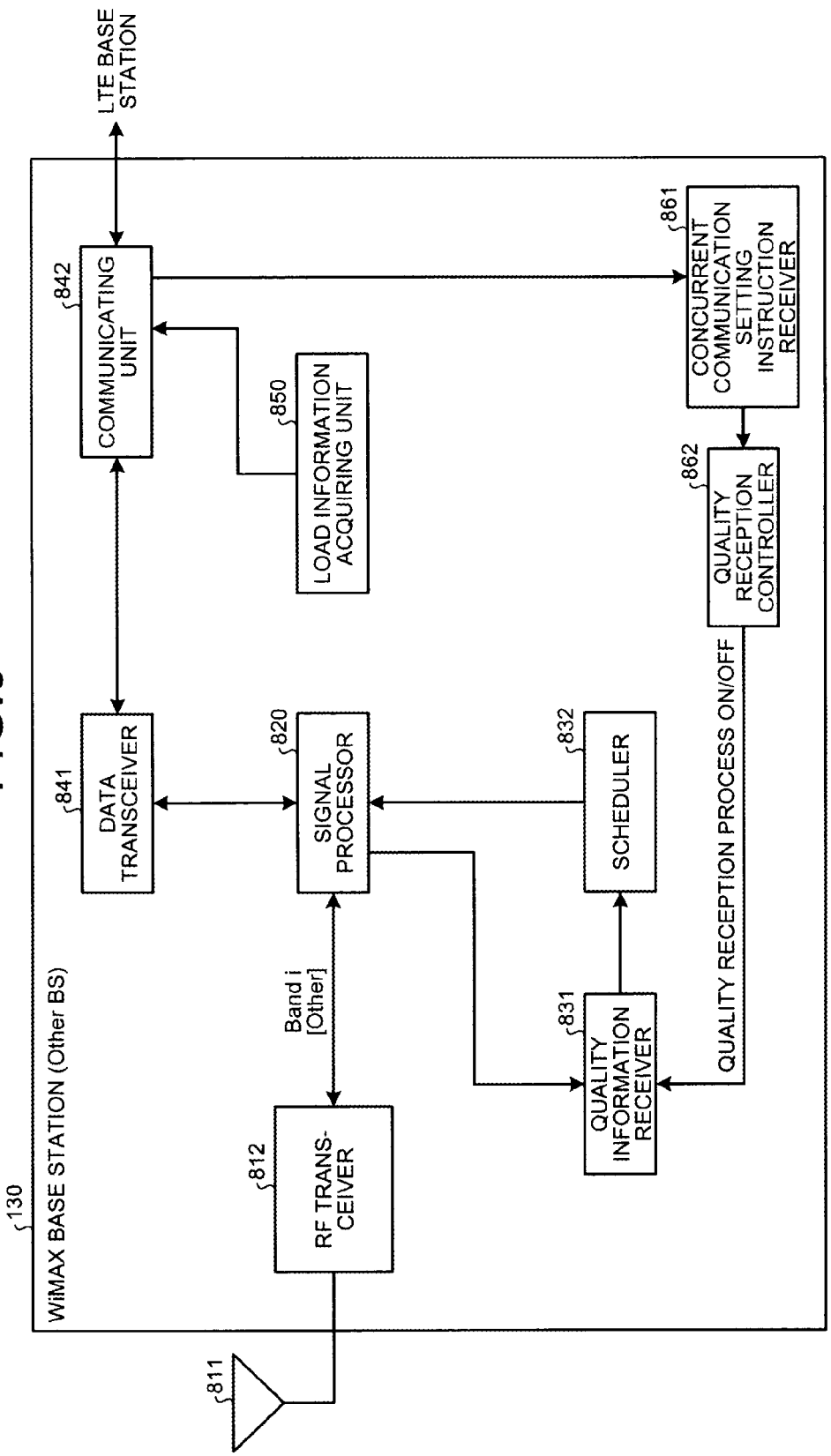
FIG. 8 is a block diagram of a base station participating in the concurrent communication.

FIG. 8 is a block diagram of a base station participating in the concurrent communication. The WiMAX base station 130 is a base station (Other BS) in a vicinity of the LTE base station 120 in communication with the mobile station 110 and participates in the concurrent communication of the mobile station 110, based on a concurrent communication setting instruction from the LTE base station 120. As depicted in FIG. 8, the WiMAX base station 130 includes an antenna 811, an RF transceiver 812, a signal processor 820, a quality information receiver 831, a scheduler 832, a data transceiver 841, a communicating unit 842, a load information acquiring unit 850, a concurrent communication setting instruction receiver 861, and a quality reception controller 862. The RF transceiver 812 performs radio communication via the antenna 811 with the mobile station 110.

The signal processor 820 corresponds to the Band [Other] of the LTE scheme. The signal processor 820 executes transmission/reception processes of signals to/from the mobile station 110 via the antenna 811 and the RF transceiver 812. The signal processor 820 outputs a control signal received from the mobile station 110 to the quality information receiver 831. The signal processor 820 controls communication between the WiMAX base station 130 and the mobile station 110, based on a scheduling result output from the scheduler 832.

The quality information receiver 831 receives quality information included in the control signal output from the signal processor 820. The quality information receiver 831 outputs the received quality information to the scheduler 832. The scheduler 832 schedules the communication between the WiMAX base station 130 and the mobile station 110, based on the quality information output from the quality information receiver 831. The scheduler 832 outputs the scheduling result to the signal processor 820.

The data transceiver 841 relays data communication between the mobile station 110 and the LTE base station 120. For example, the data transceiver 741 transmits/receives data via the signal processor 820 to/from the mobile station 110. The data transceiver 841 transmits/receives data via the communicating unit 842 to/from the LTE base station 120.

The communicating unit 842 is a communication interface for performing communication with a base station (e.g., the LTE base station 120) in a vicinity of the WiMAX base station 130. The communicating unit 842 transmits to the concurrent communication setting instruction receiver 861, a control signal received from a base station in a vicinity of the WiMAX base station 130. The communicating unit 842 transmits to a base station in a vicinity of the WiMAX base station 130 the load information output from the load information acquiring unit 850.

The concurrent communication setting instruction receiver 861 receives a concurrent communication setting instruction included in the control signal output from the communicating unit 842. The concurrent communication setting instruction receiver 861 outputs the received concurrent communication setting instruction to the quality reception controller 862.

The quality reception controller 862 controls turning on/off the quality reception process of the quality information receiver 831, based on the concurrent communication setting instruction output from the concurrent communication setting instruction receiver 861. For example, the quality reception controller 862 turns on the quality reception process from the mobile station 110 performing the concurrent communication using the radio interface of the WiMAX base station 130. The quality reception controller 862 turns off the quality reception process from the mobile station 110 when the concurrent communication of the mobile station 110 using the radio interface of the WiMAX base station 130 is terminated.

Figure 9:
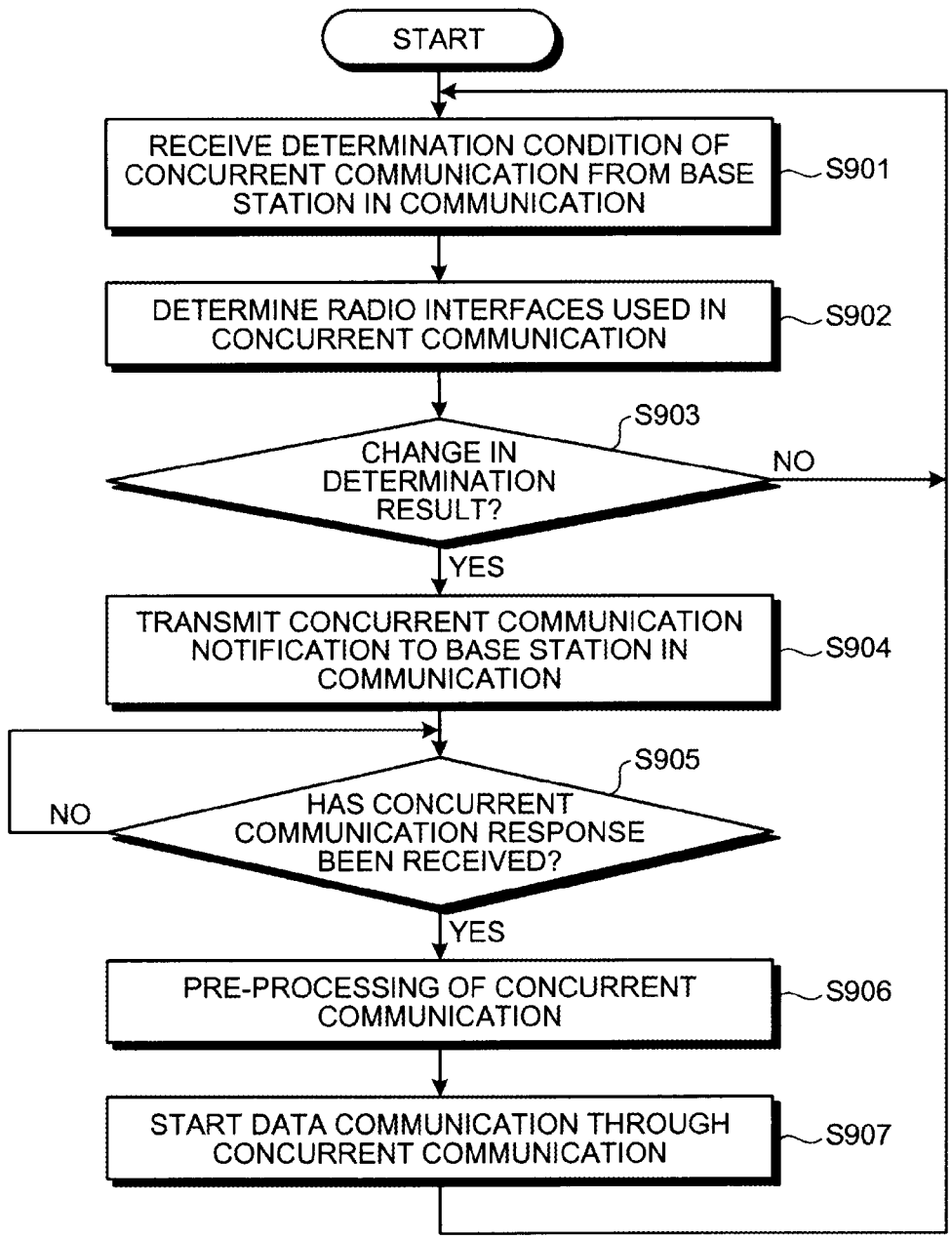
FIG. 9 is a flowchart of an example of operations of a mobile station.

FIG. 9 is a flowchart of an example of operations of the mobile station. The mobile station 110 executes the following steps, for example. The mobile station 110 receives the determination condition of the concurrent communication from the base station (the LTE base station 120) in communication (step S901). Based on the determination condition received at step S901, the mobile station 110 determines the radio interfaces used in the concurrent communication (step S902).

The mobile station 110 then determines whether there has been a change in the determination result at the present execution of the operations at step S902 since the previous execution of the operations at step S902 (step S903). However, at the first execution of the operations at step S903, a change is considered to have been made in the determination result. If there is no change in the determination result (step S903: NO), the mobile station 110 returns to step S901.

If there is a change in the determination result at step S903 (step S903: YES), the mobile station 110 transmits a concurrent communication notification including the determination result at this step S902 to the base station (the LTE base station 120) in communication (step S904). The mobile station 110 determines whether a concurrent communication response has been received (step S905), and waits until the concurrent communication response has been received (step S905: NO).

When the concurrent communication response has been received at step S905 (step S905: YES), the mobile station 110 executes pre-processing of the concurrent communication (step S906). The mobile station 110 starts the data communication through the concurrent communication (step S907) and the mobile station 110 returns to step S901.

Through the operations described above, if a suitable radio interface has been changed due to a change in the received determination condition or a change in the communication state of the mobile station 110, the mobile station 110 can again transmit to the LTE base station 120, a concurrent communication notification to change the radio interface. As a result, suitable concurrent communication can be performed according to a change in a load amount of a base station in a vicinity of the LTE base station 120 or the communication state of the mobile station 110.

Figure 10:
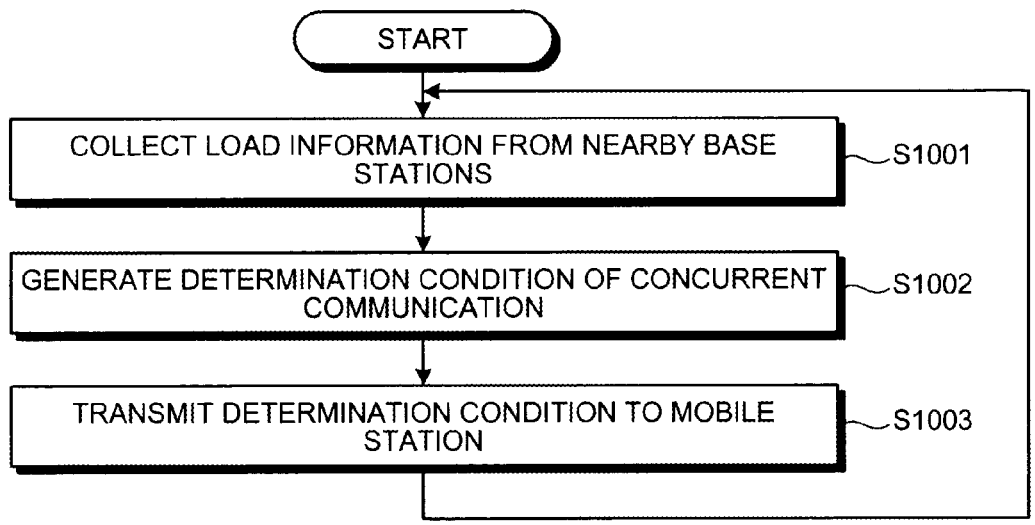
FIG. 10 is a flowchart of an example of determination condition transmission operations by the base station controlling the concurrent communication.

FIG. 10 is a flowchart of an example of determination condition transmission operations by the base station controlling the concurrent communication. The LTE base station 120 executes the following steps as determination condition transmission operations, for example. The LTE base station 120 collects load information from nearby base stations (step S1001). The nearby base stations are the WiMAX base station 130 and the W-CDMA base station 210 in the example depicted in FIG. 2, for example.

The LTE base station 120 then generates the determination condition of the concurrent communication at the mobile station 110, based on the load information collected at step S1001 (step S1002). The LTE base station 120 transmits to the mobile station 110, the determination condition generated at step S1002 (step S1003) and the LTE base station 120 returns to step S1001.

Through the operations at the steps described above, the LTE base station 120 can periodically collect the load information of the nearby base stations and periodically transmit to the mobile station 110, the determination condition of the concurrent communication notification at the mobile station 110. As a result, the mobile station 110 can be allowed to make a determination concerning the concurrent communication with suitable determination condition according to a change in the load amount of a base station in a vicinity of the LTE base station 120.

Figure 11:
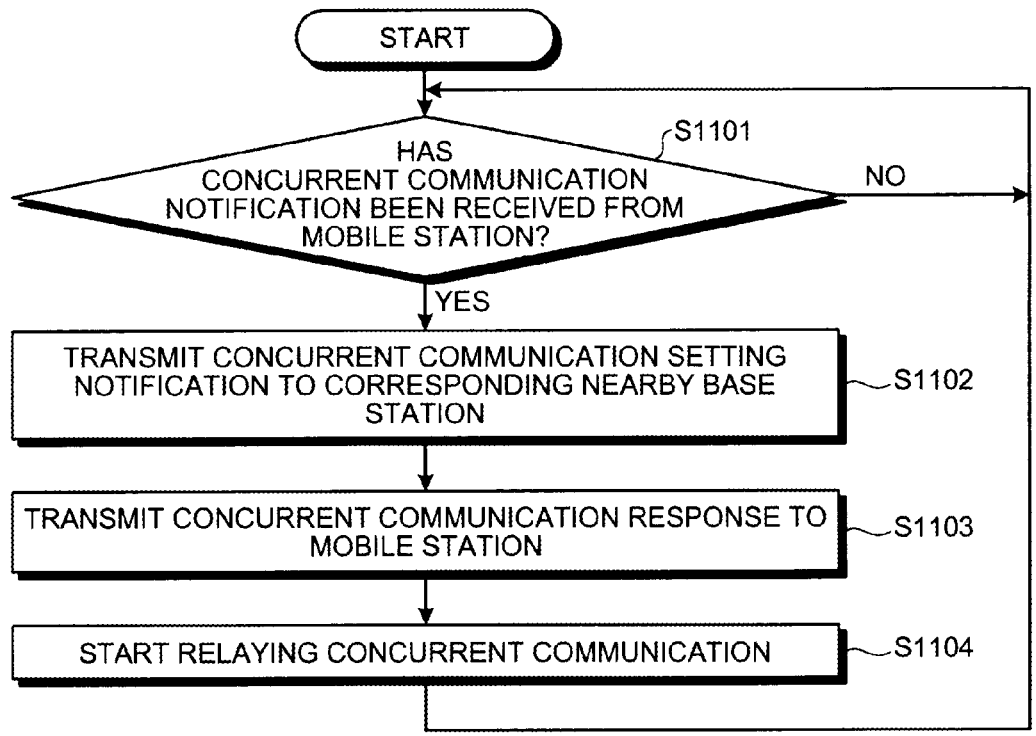
FIG. 11 is a flowchart of an example of concurrent communication control operations by the base station controlling the concurrent communication.

FIG. 11 is a flowchart of an example of concurrent communication control operations by the base station controlling the concurrent communication. The LTE base station 120 executes the following steps as concurrent communication control operations, for example. The LTE base station 120 determines whether a concurrent communication notification indicative of a determination result concerning the concurrent communication has been received from the mobile station 110 (step S1101) and waits until the concurrent communication notification has been received (step S1101: NO).

When the concurrent communication notification has been received at step S1101 (step S1101: YES), the LTE base station 120 transmits a concurrent communication setting notification to a nearby base station corresponding to a radio interface used in the concurrent communication, based on the received concurrent communication notification (step S1102). The LTE base station 120 transmits to the mobile station 110, a concurrent communication response for a received concurrent communication setting notification (step S1103). The LTE base station 120 starts relaying the concurrent communication of the mobile station 110 (step S1104) and returns to step S1101. Through the operations described above, the LTE base station 120 can control the concurrent communication at the mobile station 110.

Figure 12:
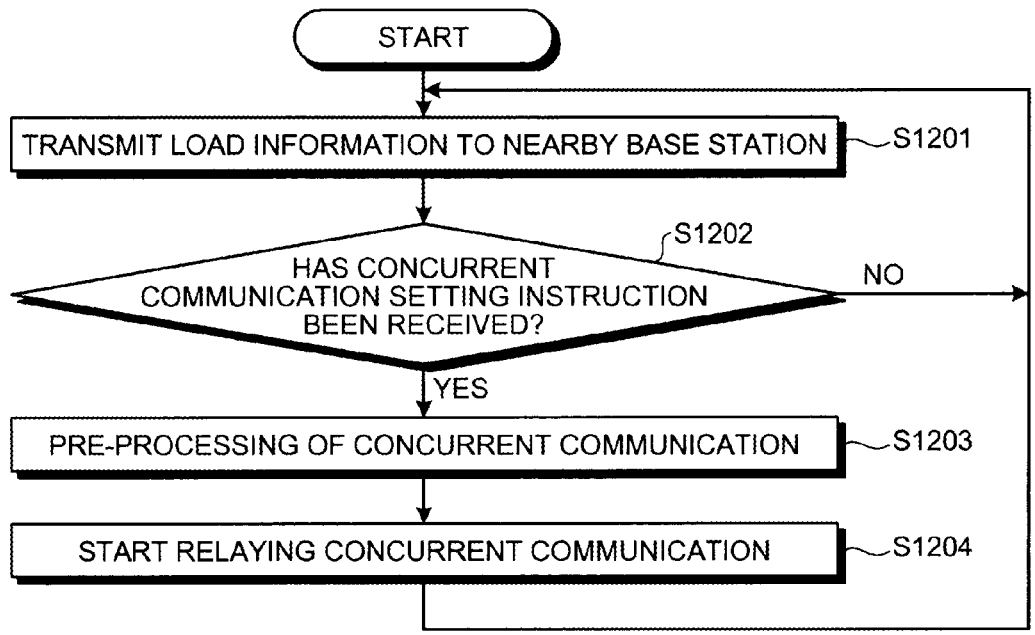
FIG. 12 is a flowchart of an example of operations of the base station participating in the concurrent communication.

FIG. 12 is a flowchart of an example of operations of the base station participating in the concurrent communication. The WiMAX base station 130 or the W-CDMA base station 210 participating in the concurrent communication of the mobile station 110 executes the following steps, for example. The base station transmits load information to a nearby base station (step S1201). For example, the WiMAX base station 130 transmits to the LTE base station 120 and the W-CDMA base station 210, load information indicative of the load amounts of radio interfaces of the WiMAX base station 130. The W-CDMA base station 210 transmits to the LTE base station 120 and the WiMAX base station 130, load information indicative of the load amount of the W-CDMA base station 210.

The base station then determines whether a concurrent communication setting instruction has been received from the nearby base station to which the load information was transmitted (step S1202). If the concurrent communication setting instruction has not been received (step S1202: NO), the operation returns to step S1202. If the concurrent communication setting instruction has been received (step S1202: YES), the base station executes pre-processing of the concurrent communication at the mobile station 110, based on the received concurrent communication setting instruction (step S1203).

The base station starts relaying the concurrent communication at the mobile station 110 (step S1204) and the operation returns to step S1201. Through the operations described above, the WiMAX base station 130 or the W-CDMA base station 210 can periodically transmit the load information thereof to the LTE base station 120 and can participate in the concurrent communication of the mobile station 110 when the concurrent communication setting instruction is received from the LTE base station 120.

Figure 13:
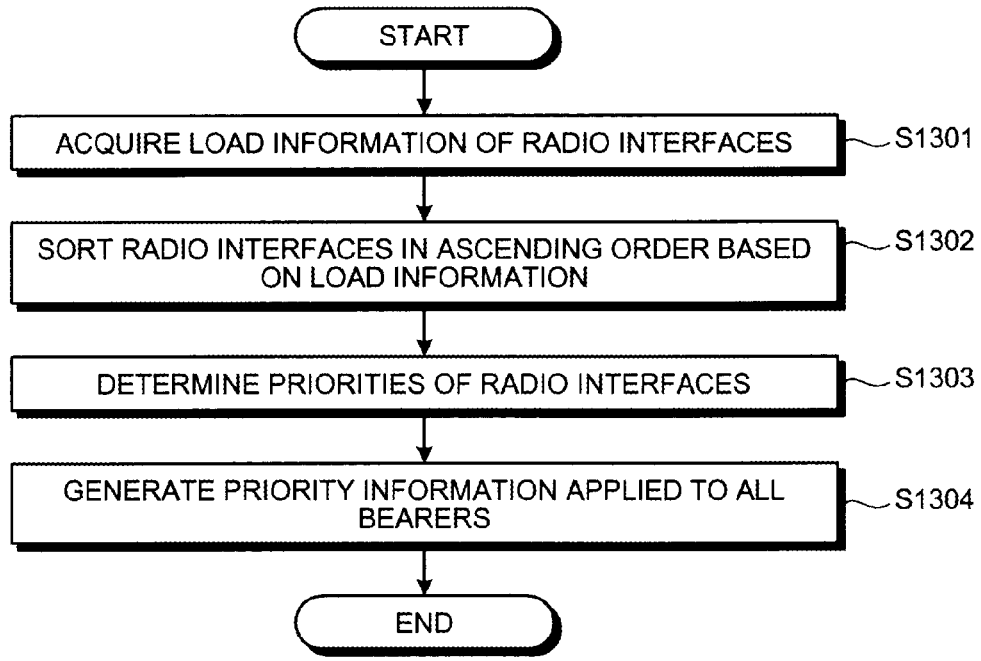
FIG. 13 is a flowchart of a first example of priority information generation operations by the base station.

FIG. 13 is a flowchart of a first example of priority information generation operations by the base station. The LTE base station 120 executes the following operations as priority information generation operations, for example. The LTE base station 120 acquires the load information of the radio interfaces (step S1301). The LTE base station 120 sorts the radio interfaces in an ascending order based on the load information acquired at step S1301 (step S1302). For example, the radio interfaces are sorted in ascending order of load amount.

The LTE base station 120 determines the priorities of the radio interfaces based on the sort result at step S1302 (step S1303). For example, the priorities are determined such that a higher priority is given to a radio interface having a smaller load. The LTE base station 120 generates the priority information in which the determination result at step S1303 is applied to all the bearers used by the mobile station 110 (step S1304) and the series of operations is terminated.

Figure 14:
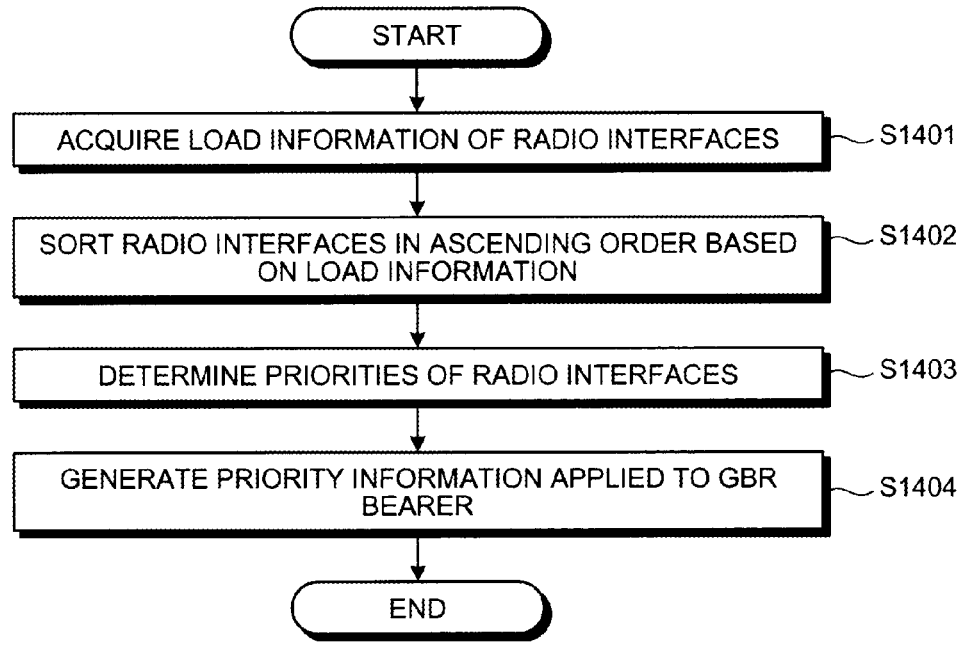
FIG. 14 is a flowchart of a second example of priority information generation operations by the base station.

FIG. 14 is a flowchart of a second example of priority information generation operations by the base station. The LTE base station 120 may execute the following operations as priority information generation operations, for example. The operations at steps S1401 to S1403 depicted in FIG. 14 are identical to the operations at steps S1301 to S1303 depicted in FIG. 13 and will not be described.

Following step S1403, the LTE base station 120 generates the priority information in which the determination result at step S1403 is applied to a GBR bearer used by the mobile station 110 (step S1404) and the series of operations is terminated. The GBR bearer is a bearer guaranteed to have the lowest transmission rate (e.g., VoIP) among the bearers used by the mobile station 110.

In this case, the determination condition of the concurrent communication is not generated for a bearer that is not guaranteed to have the lowest transmission rate (e.g., BE) among the bearers used by the mobile station 110. The mobile station 110 does not perform the concurrent communication for a bearer having no determination condition of the concurrent communication determined. When the concurrent communication is performed for the GBR bearer without performing the concurrent communication for bearers not guaranteed to have the lowest transmission rate as described above, the throughput of the GBR bearer can be improved while suppressing increases in the other traffic due to the concurrent communication.

Figure 15:
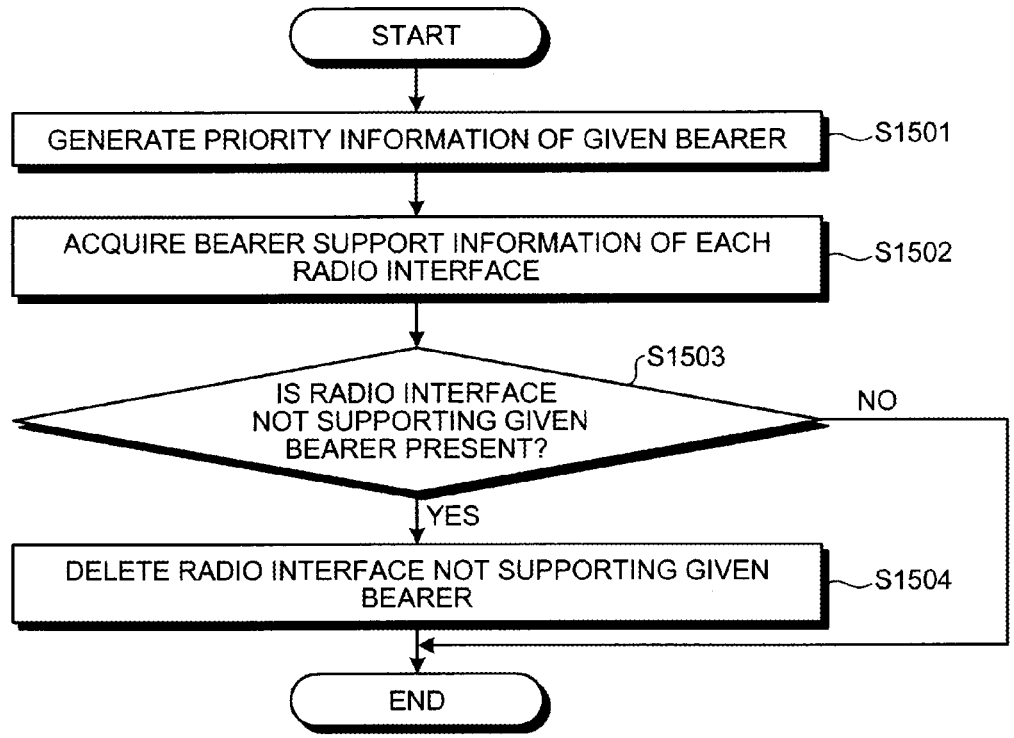
FIG. 15 is a flowchart of a third example of priority information generation operations by the base station.

FIG. 15 is a flowchart of a third example of priority information generation operations by the base station. The LTE base station 120 may execute the following operations for each bearer used by the mobile station 110 as priority information generation operations, for example. The LTE base station 120 generates priority information of a given bearer (step S1501). The operation at step S1501 can be implemented with the steps depicted in FIG. 13, for example.

The LTE base station 120 acquires bearer support information of each radio interface (step S1502). The bearer support information is information indicative of a bearer supported by a radio interface. Based on the bearer support information acquired at step S1502, the LTE base station 120 determines whether a radio interface not supporting the given bearer is present (step S1503).

If a radio interface not supporting the given bearer is not present at step S1503 (step S1503: NO), the series of operations is terminated. If a radio interface not supporting the given bearer is present at step S1503 (step S1503: YES), the radio interface not supporting the given bearer is deleted from the priority information generated at step S1501 (step S1504) and the series of operations is terminated.

By executing the operations described above for each bearer, the radio interfaces not supporting the bearer can be excluded from the priority information of the bearers. As a result, the determination of the concurrent communication can be made efficiently at the mobile station 110. The LTE base station 120 preliminarily stores the bearer support information for each radio interface in a memory, for example. Alternatively, the LTE base station 120 may make an inquiry to a base station corresponding to each radio interface to acquire the bearer support information for each radio interface.

Figure 16:
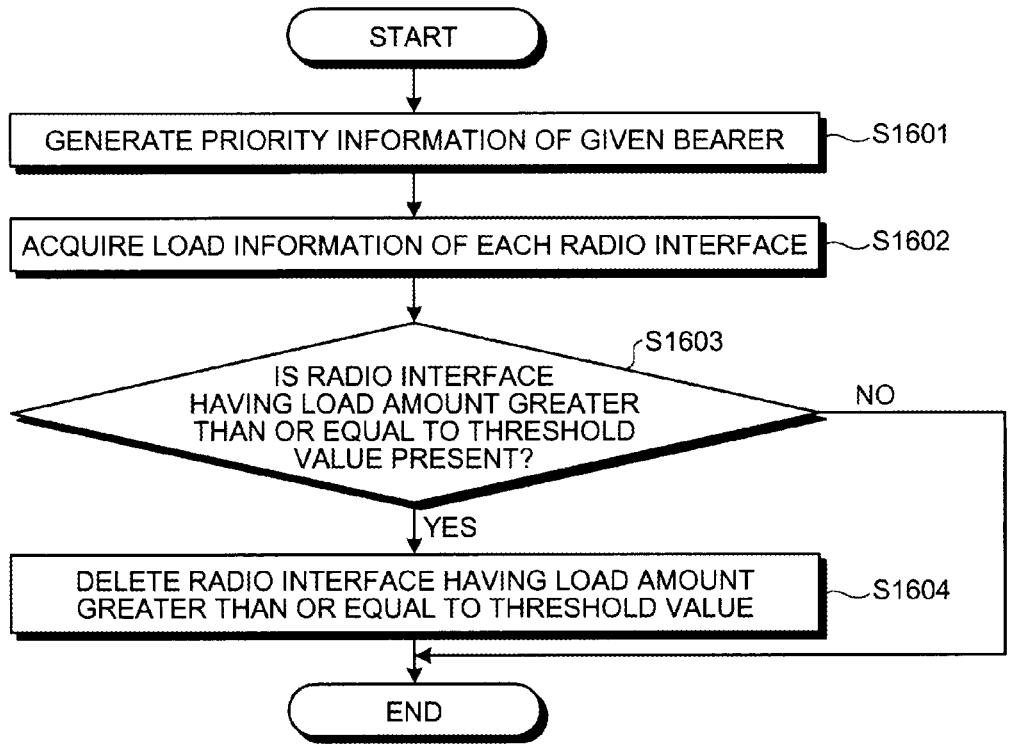
FIG. 16 is a flowchart of a fourth example of priority information generation operations by the base station.

FIG. 16 is a flowchart of a fourth example of priority information generation operations by the base station. The LTE base station 120 may execute the following operations for each bearer used by the mobile station 110 as priority information generation operations, for example. The LTE base station 120 generates priority information of a given bearer (step S1601). Step S1601 can be implemented by the operations at the steps depicted in FIG. 13, for example.

The LTE base station 120 acquires the load information of each radio interface (step S1602). For example, the LTE base station 120 receives from nearby base stations, the load information of constituent radio interfaces compatible with the nearby base stations. The LTE base station 120 acquires the load information of constituent radio interfaces compatible with the LTE base station 120 from the management information of the LTE base station 120. Based on the load information acquired at step S1602, the LTE base station 120 determines whether a radio interface is present that has a load amount greater than or equal to a threshold value (step S1603).

At step S1603, if no radio interface is present that has a load amount greater than or equal to the threshold value (step S1603: NO), the series of operations is terminated. If a radio interface is present that has a load amount greater than or equal to the threshold value (step S1603: YES), the radio interface having a load amount greater than or equal to the threshold value is deleted from the priority information generated at step S1601 (step S1604) and the series of operations is terminated.

By executing the steps described above for each bearer, the radio interfaces having a load amount greater than or equal to the threshold value can be excluded from the priority information of the bearers. As a result, the concurrent communication at the mobile station 110 is performed with the radio interfaces having a load amount less than the threshold value. Therefore, the throughput of the concurrent communication can be improved.

The LTE base station 120 preliminarily stores in a memory, the threshold value that is compared with the load amount at step S1603, for example. The LTE base station 120 may store in the memory, a different threshold value for each bearer. In this case, the LTE base station 120 compares a different threshold value with a load amount for each bearer at step S1603. As a result, the communication quality of the concurrent communication at the mobile station 110 can be controlled for each bearer. For example, a larger threshold value is set for a bearer with a need for reliable communication (e.g., emergency call and GBR) and a smaller threshold value is set for a bearer with a larger delay tolerance (e.g., BE).

Figure 17:
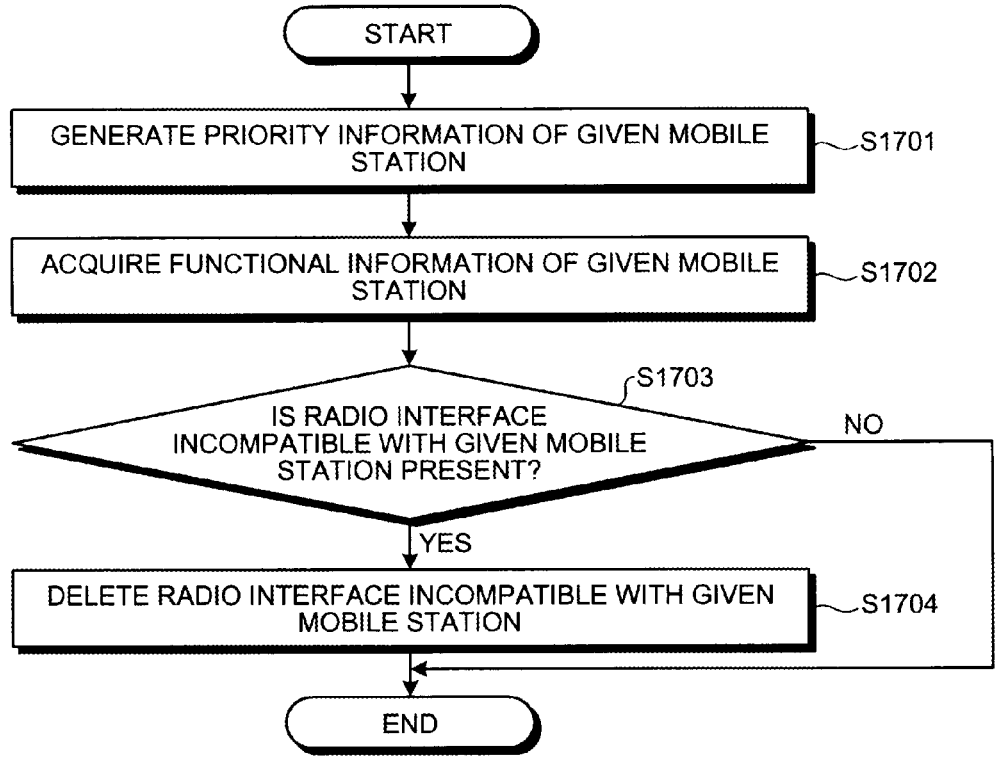
FIG. 17 is a flowchart of a fifth example of priority information generation operations by the base station.

FIG. 17 is a flowchart of a fifth example of priority information generation operations by the base station. The LTE base station 120 may execute as priority information generation operations, the following steps for each mobile station (e.g., the mobile station 110) in the cell of the LTE base station 120, for example. The LTE base station 120 generates priority information of a given mobile station (step S1701). The operation at step S1701 can be implemented with the operations at the steps depicted in FIG. 13, for example.

The LTE base station 120 acquires functional information (Capability) of the given mobile station (step S1702). The functional information is information indicative of the radio interfaces compatible with the mobile station. Based on the functional information acquired at step S1702, the LTE base station 120 determines whether a radio interface incompatible with the given mobile station is present (step S1703).

If a radio interface incompatible with the given mobile station is not present at step S1703 (step S1703: NO), the series of operations is terminated. If a radio interface incompatible with the given mobile station is present (step S1703: YES), the radio interface incompatible with the given mobile station is deleted from the priority information generated at step S1701 (step S1704) and the series of operations is terminated.

By executing the steps described above for each mobile station, the radio interfaces incompatible with the mobile station can be excluded from the priority information of the mobile stations. As a result, the determination of the concurrent communication can efficiently be made in the mobile station 110. The LTE base station 120 preliminarily stores the functional information for each mobile station in a memory, for example. Alternatively, the LTE base station 120 may make an inquiry to base stations to acquire the functional information of the respective base stations. The LTE base station 120 transmits the determination condition including the priority information generated at steps of FIG. 17 to the mobile stations, for example, through unicast (e.g., FIG. 27).

Figure 18:
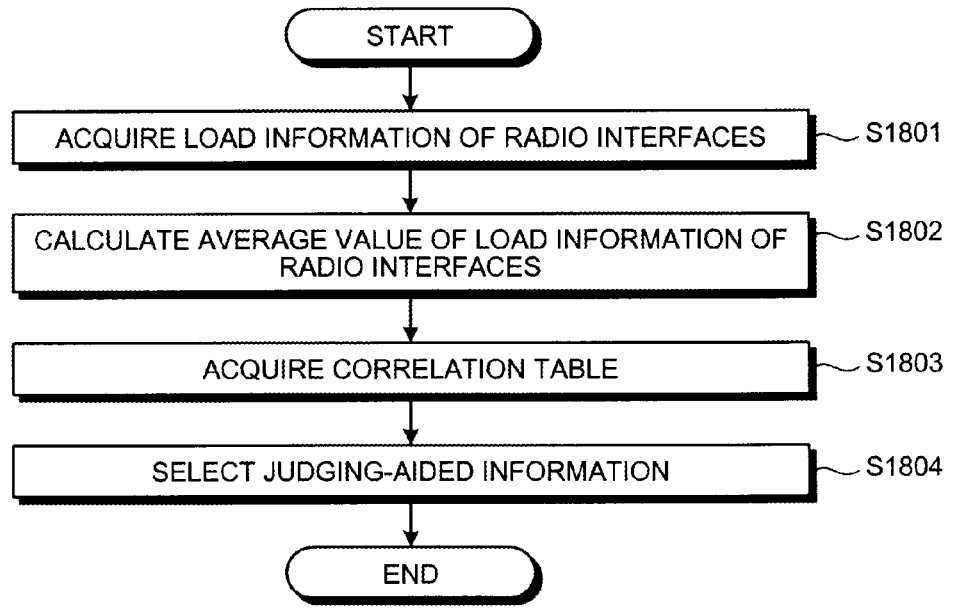
FIG. 18 is a flowchart of an example of generation operations of the judging-aided information by the base station.

FIG. 18 is a flowchart of an example of generation operations of the judging-aided information by the base station. The LTE base station 120 executes the following operations as generation operations for generating the judging-aided information of the concurrent communication count, for example. The LTE base station 120 acquires the load information of the radio interfaces (step S1801). The LTE base station 120 calculates an average value of the load information of the radio interfaces acquired at step S1801 (S1802). For example, two radio interfaces are assumed to be used when a radio usage rate is used as the load information. In this case, if the radio usage rate of one radio interface is 40% and the radio usage rate of the other radio interface is 80%, the average value of the load information is calculated as 60%.

The LTE base station 120 acquires a correlation table in which the average value of the load information of the radio interfaces is correlated with the judging-aided information of the concurrent communication count (step S1803). The LTE base station 120 selects the judging-aided information of the concurrent communication count, based on the average value calculated at step S1802 and the correlation table acquired at step S1803 (step S1804) and the series of operations is terminated. The LTE base station 120 transmits the judging-aided information selected at step S1804 to the mobile station 110 as the determination condition of the correlation communication.

FIG. 19 is a diagram of a first example of the correlation table between the average value of the load information and the judging-aided information. FIG. 20 is a diagram of a first example of the judging-aided information of the concurrent communication count. FIG. 21 is a diagram of a second example of the judging-aided information of the concurrent communication count. For example, the LTE base station 120 stores a correlation table in which the average value of the load information of the radio interfaces is correlated with the judging-aided information of the concurrent communication count for each bearer.

The LTE base station 120 stores a correlation table 1900 depicted in FIG. 19 as a correlation table corresponding to a bearer of VoIP, for example. The LTE base station 120 stores in a memory, judging-aided information VoIP-A (see FIG. 20), judging-aided information VoIP-B (see FIG. 21), and judging-aided information VoIP-C (not depicted) as candidates of the judging-aided information of the concurrent communication count.

In the correlation table 1900, a range of the average value of the load information from 0 to 50[%] is correlated with the judging-aided information VoIP-A. In the correlation table 1900, a range of the average value of the load information from 51 to 75[%] is correlated with the judging-aided information VoIP-B. In the correlation table 1900, a range of the average value of the load information from 76 to 100[%] is correlated with the judging-aided information VoIP-C.

In this case, in the correlation table 1900, a larger average value of the load information is correlated with judging-aided information with which the concurrent communication is performed less easily. For example, the judging-aided information VoIP-B (see FIG. 21) has a wider range of the average value of the load information for a concurrent communication count of one as compared to the judging-aided information VoIP-A (see FIG. 20).

The LTE base station 120 selects the judging-aided information corresponding to the average value of the load information from the correlation table 1900 at step S1803 of FIG. 18. The LTE base station 120 reads the selected judging-aided information from the memory and transmits to the mobile station 110, the read judging-aided information as the determination condition of the concurrent communication corresponding to the bearer of VoIP.

Figures 23, 24, 25:
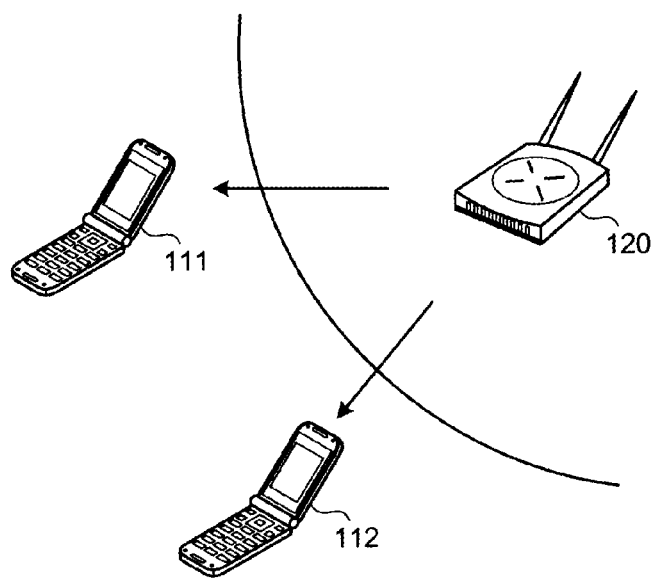
FIG. 23 is a diagram of a third example of the judging-aided information of the concurrent communication count.
FIG. 24 is a diagram of an example of execution condition information of the concurrent communication.
FIG. 25 is a diagram of transmission of the determination condition through broadcast.

FIG. 22 is a diagram of a second example of the correlation table between the average value of the load information and the judging-aided information. FIG. 23 is a diagram of a third example of the judging-aided information of the concurrent communication count. The LTE base station 120 stores a correlation table 2200 depicted in FIG. 22 as a correlation table corresponding to a bearer of BE, for example. The LTE base station 120 stores in a memory, judging-aided information BE-A (not depicted) and judging-aided information BE-B (see FIG. 23) as candidates of the judging-aided information of the concurrent communication count.

In the correlation table 2200, a range of the average value of the load information from 0 to 60[%] is correlated with the judging-aided information BE-A. In the correlation table 2200, a range of the average value of the load information from 61 to 100[%] is correlated with the judging-aided information BE-B.

The LTE base station 120 selects the judging-aided information corresponding to the average value of the load information from the correlation table 2200 at step S1803 of FIG. 18. The LTE base station 120 reads the selected judging-aided information from the memory and transmits to the mobile station 110, the read judging-aided information as the determination condition of the concurrent communication corresponding to the bearer of BE.

In the judging-aided information BE-B, the concurrent communication count is correlated with each range of a combination of the maximum transfer delay amount (transfer delay) of the mobile station 110 and the throughput of the mobile station 110. In the judging-aided information of the concurrent communication count, a combination of multiple types of communication states of the mobile station 110 (e.g., the maximum transfer delay amount and the throughput) may be correlated with the concurrent communication count. As a result, the concurrent communication count can be set flexibly according multiple types of communication states of the mobile station 110.

FIG. 24 is a diagram of an example of execution condition information of the concurrent communication. The LTE base station 120 may transmit to the mobile station 110, for example, a table 2400 depicted in FIG. 24 as the execution condition information of the concurrent communication along with the judging-aided information of the concurrent communication count, for example. In the table 2400, a state of the mobile station 110 is correlated with information indicative of whether the concurrent communication is executed (OK or NG). In this example, a battery remaining amount is used as the state of the mobile station 110.

In table 2400, a range of the battery remaining amount of the mobile station 110 from 31 to 100[%] is correlated with concurrent communication OK. In table 2400, a range of the battery remaining amount of the mobile station 110 from 0 to 30[%] is correlated with concurrent communication NG. The mobile station 110 determines whether the concurrent communication is executed, based on the table 2400 received from the LTE base station 120 as the determination condition of the concurrent communication and the battery remaining amount of the mobile station 110.

For example, the mobile station 110 determines that the concurrent communication is not executed (NG) if the battery remaining amount is 0 to 30[%] and determines the concurrent communication count as one regardless of the communication state of the mobile station 110. The mobile station 110 determines that the concurrent communication is executed if the battery remaining amount is 31 to 100[%] and determines the concurrent communication count of the concurrent communication based on the judging-aided information of the concurrent communication count.

As described above, the determination condition of the concurrent communication transmitted from the LTE base station 120 to the mobile station 110 may include the execution condition information (table 2400) indicative of the execution condition for determining whether the concurrent communication is executed. The mobile station 110 makes a determination concerning the concurrent communication based on the execution condition information included in the determination condition. As a result, if the execution of the concurrent communication is not desirable because of an insufficient battery remaining amount, the concurrent communication can be prohibited regardless of the communication state of the mobile station 110.

FIG. 25 is a diagram of the transmission of the determination condition through broadcast. Each of the mobile stations 111 and 112 depicted in FIG. 25 is a mobile station corresponding to the mobile station 110 described above. The LTE base station 120 generates the determination condition of the concurrent communication and transmits through broadcast, the generated determination condition to mobile stations within the cell of the LTE base station 120, thereby enabling a reduction in control channel radio usage for the transmission of the determination condition of the concurrent communication.

Figure 26:
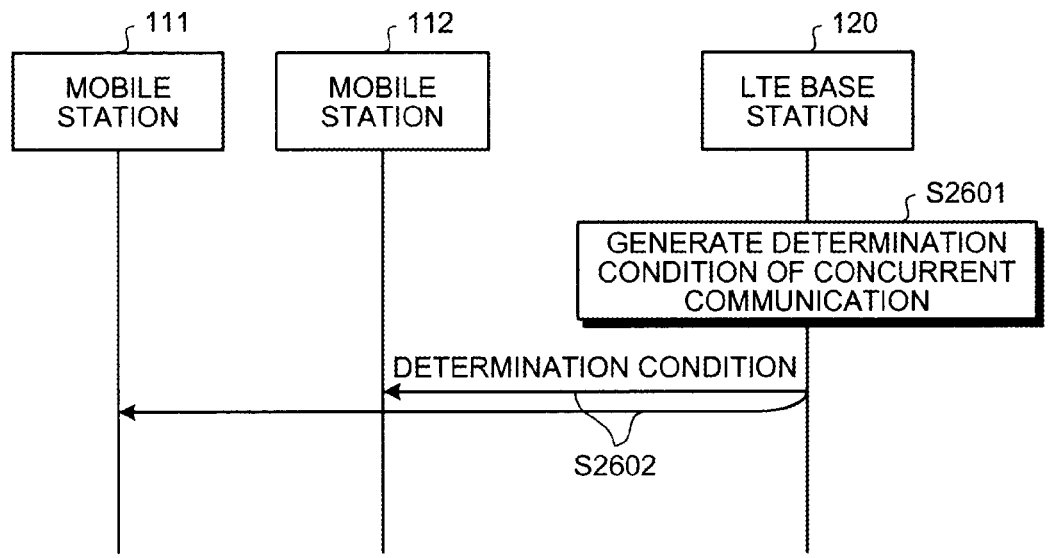
FIG. 26 is a sequence diagram of the transmission of the determination condition depicted in FIG. 25.

FIG. 26 is a sequence diagram of the transmission of the determination condition depicted in FIG. 25. The LTE base station 120 generates the determination condition of the concurrent communication common to the mobile stations 111 and 112 (step S2601). The LTE base station 120 transmits, through broadcast, the determination condition of the concurrent communication generated at step S2601 (step S2602) and the series of operations is terminated. The determination condition of the concurrent communication transmitted at step S2602 is received by the mobile stations 111 and 112. Each of the mobile stations 111 and 112 makes a determination concerning the concurrent communication based on the common determination condition.

Figure 27:
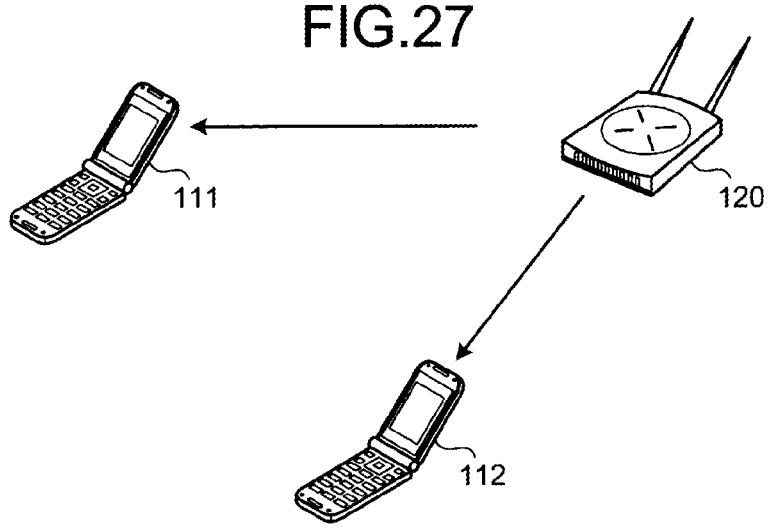
FIG. 27 is a diagram of the transmission of the determination condition through unicast.

FIG. 27 is a diagram of the transmission of the determination condition through unicast. The LTE base station 120 generates the determination condition of the concurrent communication for each of the mobile stations 111 and 112, for example, and respectively transmits the generated determination condition to the mobile stations 111 and 112 through unicast, thereby enabling the transmission of the determination condition generated according to the communication capacity and the communication state of each of the mobile stations 111 and 112. Thus, the concurrent communication can be controlled flexibly.

Figure 28:
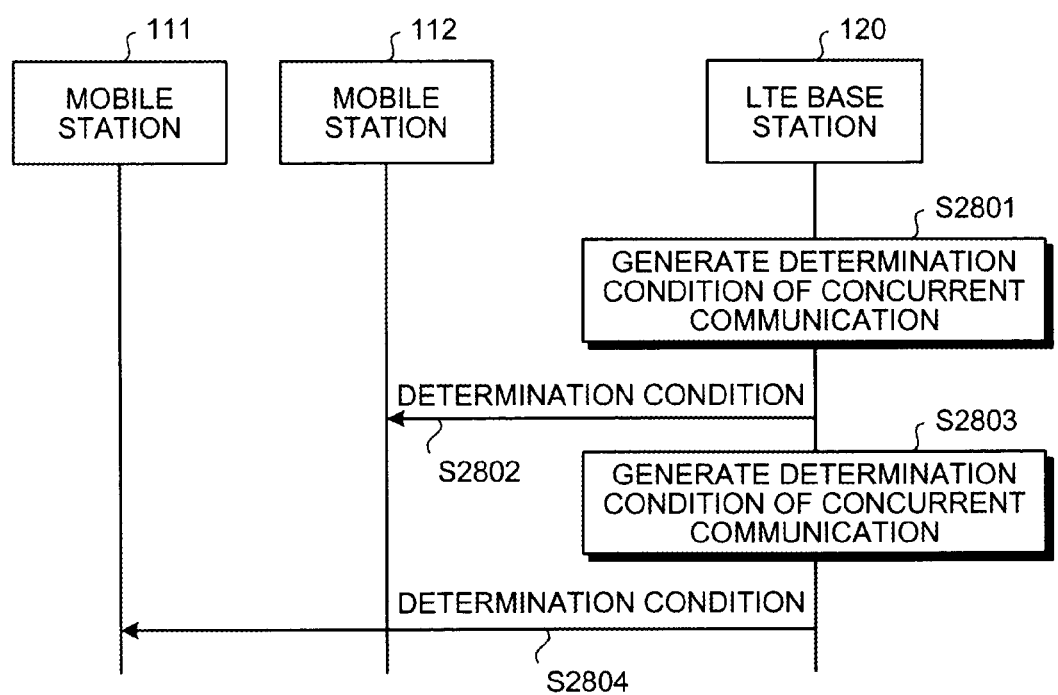
FIG. 28 is a sequence diagram of the transmission of the determination condition depicted in FIG. 27.

FIG. 28 is a sequence diagram of the transmission of the determination condition depicted in FIG. 27. The LTE base station 120 generates the determination condition of the concurrent communication of the mobile station 112 (step S2801). The LTE base station 120 transmits the determination condition of the concurrent communication generated at step S2801 through unicast to the mobile station 112 (step S2802).

The LTE base station 120 generates the determination condition of the concurrent communication of the mobile station 111 (step S2803). The LTE base station 120 transmits the determination condition of the concurrent communication generated at step S2803 through unicast to the mobile station 111 (step S2804) and the series of operations is terminated. Each of the mobile stations 111 and 112 makes a determination concerning the concurrent communication based on the received determination condition.

As described above, in the communication system 100 according to the embodiments, the mobile station 110 makes a determination concerning the concurrent communication based on the communication state of the mobile station 110 to enable concurrent communication without notification of the communication state from the mobile station 110 to the LTE base station 120. As a result, the control information transmitted from the mobile station 110 to the LTE base station 120 can be reduced to improve the throughput of the communication system 100.

The mobile station 110 receives from the LTE base station 120 the determination condition of the concurrent communication, i.e., a determination condition having parameters including the communication state of the mobile station 110, and determines the execution of the concurrent communication based on the received determination condition and the communication state of the mobile station 110, thereby enabling the LTE base station 120 to control the control principle of the concurrent communication at the mobile station 110. As a result, the communication of the communication system 100 can be performed efficiently.

For example, the mobile station 110 receives the determination condition including the judging-aided information correlating the communication state of the mobile station 110 and the number of radio interfaces, and determines the number of the radio interfaces used in the concurrent communication based on the judging-aided information and the communication state of the mobile station 110, thereby enabling the LTE base station 120 to control the control principle related to the concurrent communication count of the concurrent communication at the mobile station 110. Nonetheless, the judging-aided information correlating the communication state of the mobile station 110 with the number of radio interfaces may be preliminarily stored in the mobile station 110 and the mobile station 110 may determine the concurrent communication count based on the stored judging-aided information and the communication state of the mobile station 110.

The mobile station 110 receives the determination condition including the priority information indicative of the priorities of multiple radio interfaces and determines the radio interfaces used in the concurrent communication based on the priority information, thereby enabling the LTE base station 120 to control the control principle related to the radio interfaces used in the concurrent communication at the mobile station 110. Nonetheless, the priority information indicative of the priorities of the radio interfaces may preliminarily be stored in the mobile station 110 and the mobile station 110 may determine the radio interfaces used in the concurrent communication based on the stored priority information.

Although the embodiments have been described in terms of a case where the mobile station 110 determines the participation of the WiMAX base station 130 in (the addition of a radio interface to) the concurrent communication, configuration is not limited hereto. For example, the mobile station 110 may determine the exclusion of the WiMAX base station 130 from participating in the concurrent communication (the deletion of a radio interface) from the concurrent communication.

As described above, the disclosed technique can improve the throughput.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A mobile station capable of communication through a plurality of radio interfaces differing in at least one among radio scheme and frequency band, the mobile station comprising:
    a determining unit that determines execution of concurrent communication based on a communication state of the mobile station, the concurrent communication concurrently using the radio interfaces for communication;
    a communicating unit that performs the concurrent communication based on a determination result obtained by the determining unit; and
    a receiver that receives, from a base station, a determination condition of the concurrent communication, the determination condition having parameters including the communication state,
    wherein the determining unit determines the execution of the concurrent communication based on the determination condition and the communication state,
    the determination condition includes judging-aided information correlating the communication state with the number of the radio interfaces, the determining unit determines the number of the radio interfaces used in the concurrent communication based on the judging-aided information and the communication state, and
    the communicating unit concurrently uses the number of the radio interfaces determined by the determining unit to perform the concurrent communication.

2. The mobile station according to claim 1, wherein the judging-aided information correlates a combination of a plurality of types of the communication state with the number of the radio interfaces.

3. The mobile station according to claim 1, wherein
    the determination condition includes priority information that indicates priorities of the radio interfaces,
    the determining unit determines the radio interfaces used in the concurrent communication based on the priority information, and
    the communicating unit uses the radio interfaces determined by the determining unit to perform the concurrent communication.

4. The mobile station according to claim 3 and comprising an acquiring unit that acquires communication qualities of the radio interfaces, wherein
    the determining unit determines the radio interfaces used in the concurrent communication, exclusive of a radio interface for which the acquired communication quality less than a threshold value.

5. The mobile station according to claim 1, wherein the determining unit determines the execution of the concurrent communication for each bearer.

6. The mobile station according to claim 1 and comprising a transmitting unit that transmits to a base station a determination result obtained by the determining unit, wherein
    the communicating unit performs the concurrent communication under the control of the base station based on the determination result transmitted by the transmitting unit.

7. The mobile station according to claim 1, wherein
    the determination condition includes candidate information indicating a radio interface candidate used in the concurrent communication, and
    the mobile station comprises a standby unit that executes a standby process for the radio interface candidate, based on the candidate information and terminates the standby process for a radio interface different from the radio interface candidate, among the radio interfaces.

8. The mobile station according to claim 1 and comprising a notifying unit that notifies a base station that corresponds to a radio interface determined by the determining unit, of communication quality of the determined radio interface, the notifying unit giving no notification of communication quality to a base station different from the determined radio interface, among the radio interfaces.

9. The mobile station according to claim wherein
    the determination condition includes execution condition information that indicates an execution condition for determining whether the concurrent communication is executed, and
    the determining unit determines the concurrent communication based on the execution condition.

10. A base station performing radio communication with a mobile station capable of communication through a plurality of radio interfaces differing in at least one among radio scheme and frequency band, the base station comprising:
    a receiver that receives from the mobile station a concurrent communication notification indicating that execution of concurrent communication is determined, the concurrent communication concurrently using the radio interfaces for communication;
    a controller that controls the concurrent communication based on the concurrent communication notification received by the receiver; and
    a transmitting unit that transmits to the mobile station, a determination condition of the concurrent communication, the determination condition having parameters including a communication state of the mobile station
    wherein base station determines the execution of the concurrent communication based on the determination condition and the communication state,
    the determination condition includes judging-aided information correlating the communication state with the number of the radio interfaces,
    the base station determines the number of the radio interfaces used in the concurrent communication based on the judging-aided information and the communication state, and
    the controller concurrently uses the number of the radio interfaces determined by the determining unit to perform the concurrent communication.

11. The base station according to claim 10 and comprising:
    an acquiring unit that acquires load information that indicates load amounts of the radio interfaces in base stations corresponding to the radio interfaces; and
    a generating unit that generates the determination condition based on the acquired load information, wherein
    the transmitting unit transmits the generated determination condition.

12. A communication system comprising:
a mobile station capable of communication through a plurality of radio interfaces differing in at least one among radio scheme and frequency band, and determining execution of concurrent communication based on a communication state of the mobile station, the concurrent communication concurrently using the radio interfaces for communication; and
abuse station that performs the concurrent communication with the mobile station, the base station controlling the concurrent communication determined by the mobile station
wherein the mobile station receives, from the base station, a determination condition of the concurrent communication, the determination condition having parameters including the communication state,
wherein the mobile station determines the execution of the concurrent communication based on the determination condition and the communication state,
the determination condition includes judging-aided information correlating the communication state with the number of the radio interfaces, the mobile station determines the number of the radio interfaces used in the concurrent communication based on the judging-aided information and the communication state, and
the mobile station concurrently uses the number of the radio interfaces determined by the determining unit to perform the concurrent communication.

* * * * *